United States Patent
Ratcliff

(10) Patent No.: US 12,201,106 B2
(45) Date of Patent: Jan. 21, 2025

(54) FISHING AND HUNTING PREDICTION SYSTEM AND METHOD

(71) Applicant: ChasinFins, Inc., Willow Springs, NC (US)

(72) Inventor: Murphy Ernest Ratcliff, Willow Spring, NC (US)

(73) Assignee: ChasinFins, Inc., Willow Springs, NC (US)

( * ) Notice: Subject to any disclaimer, the term of this patent is extended or adjusted under 35 U.S.C. 154(b) by 80 days.

(21) Appl. No.: 17/985,335

(22) Filed: Nov. 11, 2022

(65) Prior Publication Data

US 2023/0165238 A1      Jun. 1, 2023

Related U.S. Application Data

(60) Provisional application No. 63/283,669, filed on Nov. 29, 2021.

(51) Int. Cl.
*A01M 31/00* (2006.01)
*A01K 99/00* (2006.01)
*G06Q 50/02* (2024.01)

(52) U.S. Cl.
CPC ........... *A01M 31/002* (2013.01); *A01K 99/00* (2013.01); *G06Q 50/02* (2013.01)

(58) Field of Classification Search
CPC ..... A01M 31/002; A01K 99/00; A01K 97/00; G06Q 50/02
See application file for complete search history.

(56) References Cited

U.S. PATENT DOCUMENTS

| | | | | |
|---|---|---|---|---|
| 2016/0353725 A1* | 12/2016 | Worley, III | .......... | A01K 87/007 |
| 2017/0311574 A1* | 11/2017 | Swan | ...................... | G06V 40/10 |
| 2019/0228478 A1* | 7/2019 | Chen | ...................... | G06Q 10/04 |
| 2021/0081959 A1* | 3/2021 | Sweeney | ................. | G01P 13/00 |
| 2022/0005262 A1* | 1/2022 | Honaker | ............... | G06T 19/006 |

FOREIGN PATENT DOCUMENTS

CN      106844777 A   *   6/2017   .............   G06F 16/29

* cited by examiner

*Primary Examiner* — Quan Zhen Wang
*Assistant Examiner* — Mancil Littlejohn, Jr.
(74) *Attorney, Agent, or Firm* — Ward and Smith, P.A.; Ryan K. Simmons

(57) ABSTRACT

A fishing and hunting prediction system and method. The fishing and hunting prediction system may include a server, including a fishing and hunting prediction application, a controller, operating memory, and a communications interface, and wherein the server is accessible via a network. The fishing and hunting prediction system may further include, a data store in communication with the server; one or more data sources, wherein the one or more data sources are accessible to the fishing and hunting prediction application via the network; and wherein the controller is configured to execute stored program instructions, that may include providing access to a user; receiving user profile data; receiving waypoint data for one or more waypoints; receiving data from the one or more data sources; processing the received data; and generating fishing and hunting forecasting models based on the processed data.

18 Claims, 24 Drawing Sheets

Fishing mobile app 162

FISHING AND HUNTING PREDICTION SYSTEM AND METHOD

CROSS REFERENCE TO RELATED APPLICATIONS

This application claims priority and is related to U.S. Provisional Application No. 63/283,669, filed Nov. 29, 2021, the entire disclosure of which is incorporated herein by reference.

TECHNICAL FIELD

The subject matter of the disclosed invention relates generally to systems and methods for assisting outdoorsmen and more particularly to a fishing and hunting prediction system and method.

BACKGROUND

Currently, applications exist that can perform static analysis of information about bodies of water and geographic areas and whether conditions exist for good fishing and/or hunting. For example, static information about bodies of water and geographic areas are published through National Oceanic and Atmospheric Administration (NOAA), the National Weather Service (NWS), National Aeronautics and Space Administration (NASA), and the like. This static information can include, for example, sea surface information (e.g., temperature, altitude), wind information (e.g., velocity, direction), wave information (e.g., direction, height, period), current information (e.g., velocity, direction), and the like. However, the static analysis of this information is limited with respect to determining whether good fishing and/or hunting conditions exist.

SUMMARY

In one embodiment, a fishing and hunting prediction system is provided. The fishing and hunting prediction system may include, a server, and the server may include a fishing and hunting prediction application, a controller, operating memory, and a communications interface, and wherein the server is accessible via a network. The fishing and hunting prediction system may further include, a data store in communication with the server; one or more data sources, wherein the one or more data sources are accessible to the fishing and hunting prediction application via the network; and wherein the controller is configured to execute stored program instructions, that may include providing access to a user; receiving user profile data; receiving waypoint data for one or more waypoints; receiving data from the one or more data sources; processing the received data; and generating fishing and hunting forecasting models based on the processed data. The data from the one or more data sources may include one or more of satellite data, forecast/weather data, tide data, and astronomy data. The one or more data sources may include one or more of National Weather Service (NWS), National Oceanic and Atmospheric Administration (NOAA), National Aeronautics and Space Administration (NASA), and/or other data source providers. The user may access the fishing and hunting prediction application of the fishing and hunting prediction system through the network via a web browser using a computing device or via a local fishing and hunting prediction application installed on a computing device. The user profile data may include personalized attributes data. The personalized attributes data may include conditions, parameters, and/or settings preferred by the user for certain fishing and hunting attributes. The attributes may include one or more of speed, distance, temperature measurement settings; location specific conditions; lunar phase; equipment; and/or location specific actual historical hunting/fishing data. The controller may be further configured to execute stored program instructions, that may include receiving feedback data from the user and updating the waypoint data and/or forecasting models. The feedback data may include, for a given waypoint during an actual fishing and hunting event, one or more of actual fishing and hunting results, actual weather/environmental conditions, and/or equipment used. The controller may be further configured to execute stored program instructions, comprising providing automated notifications to the user based on certain criteria of the personalized attributes data and/or as a result of a change in a generated forecasting model. The one or more waypoints may include a specific geographic location. The specific geographic location may include an actual buoy or a virtual buoy. The controller may be further configured to execute stored program instructions, which may include displaying information related to a selected one or more of the one or more waypoints. The controller may be further configured to execute stored program instructions, which may include displaying information related to a selected one or more of the one or more waypoints in real-time and/or over a defined period of time. The controller may be further configured to execute stored program instructions, which may include displaying a user selected geographic region and overlaying one or more of one or more waypoints within the displayed geographic region, current and/or historical waypoint data of the one or more waypoints within the displayed geographic region, and current and/or historical data from the one or more data sources related to the displayed geographic region and/or the one or more waypoints within the displayed geographic region.

In another embodiment, a method of using a fishing and hunting prediction system is provided. The method may include, providing a fishing and hunting prediction system. The fishing and hunting prediction system may include a server, the server may include a fishing and hunting prediction application, a controller, operating memory, and a communications interface, wherein the server is accessible via a network; a data store in communication with the server; one or more data sources, wherein the one or more data source are accessible to the fishing and hunting prediction application via the network; and wherein the controller is configured to execute stored program instructions. The stored program instructions may include providing access to a user; receiving user profile data; receiving waypoint data for one or more waypoints; receiving data from the one or more data sources; processing the received data; and generating fishing and hunting forecasting models based on the processed data. The method may further include accessing the fishing and hunting prediction application; selecting and/or creating one or more waypoints, wherein each of the one or more waypoints comprise a specific geographic location; collecting waypoint data; processing the waypoint data based on one or more personalized attributes of a user's profile data; and sending automated notifications to the user based on certain criteria of the user's profile data and the processed data. The method may further include providing feedback data from the user and updating the waypoint data and/or forecasting models. The feedback data may include, for a given waypoint during an actual fishing and hunting event, one or more of actual fishing and hunting results, actual weather/environmental conditions, and equipment used. The method may further include displaying information related to a selected one or more of the one or more waypoints.

BRIEF DESCRIPTION OF THE DRAWINGS

Figure 1:
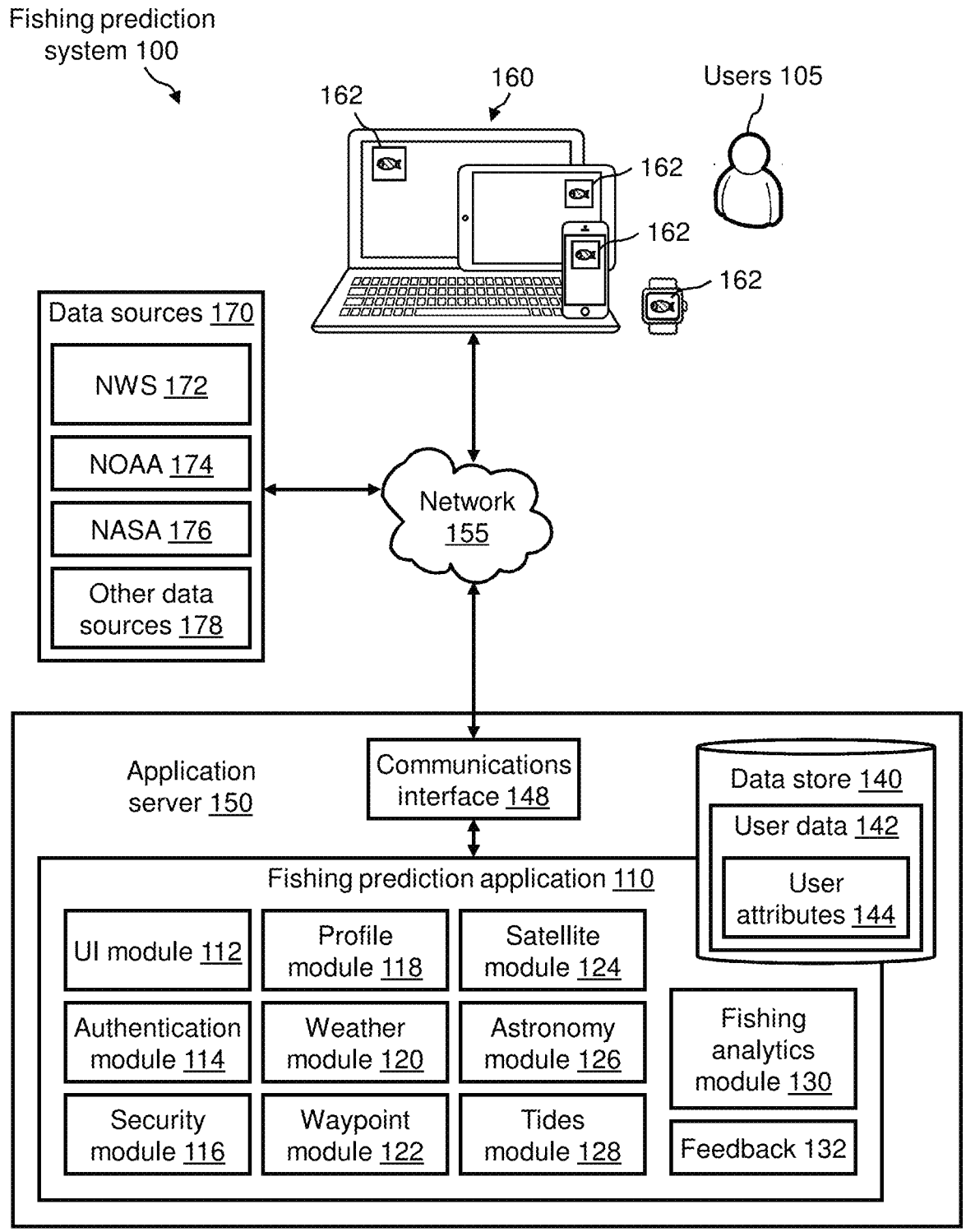
Figure 2:
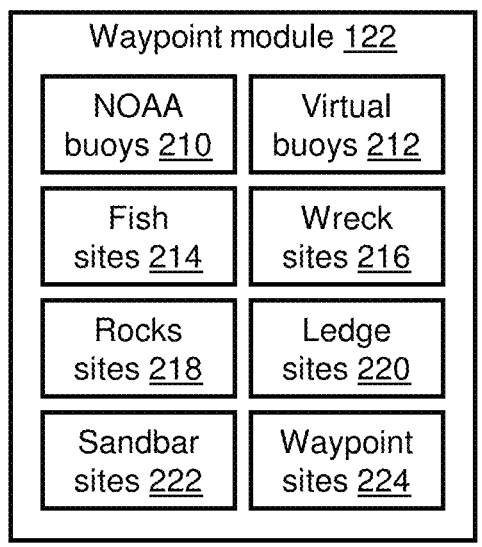
Figure 3:
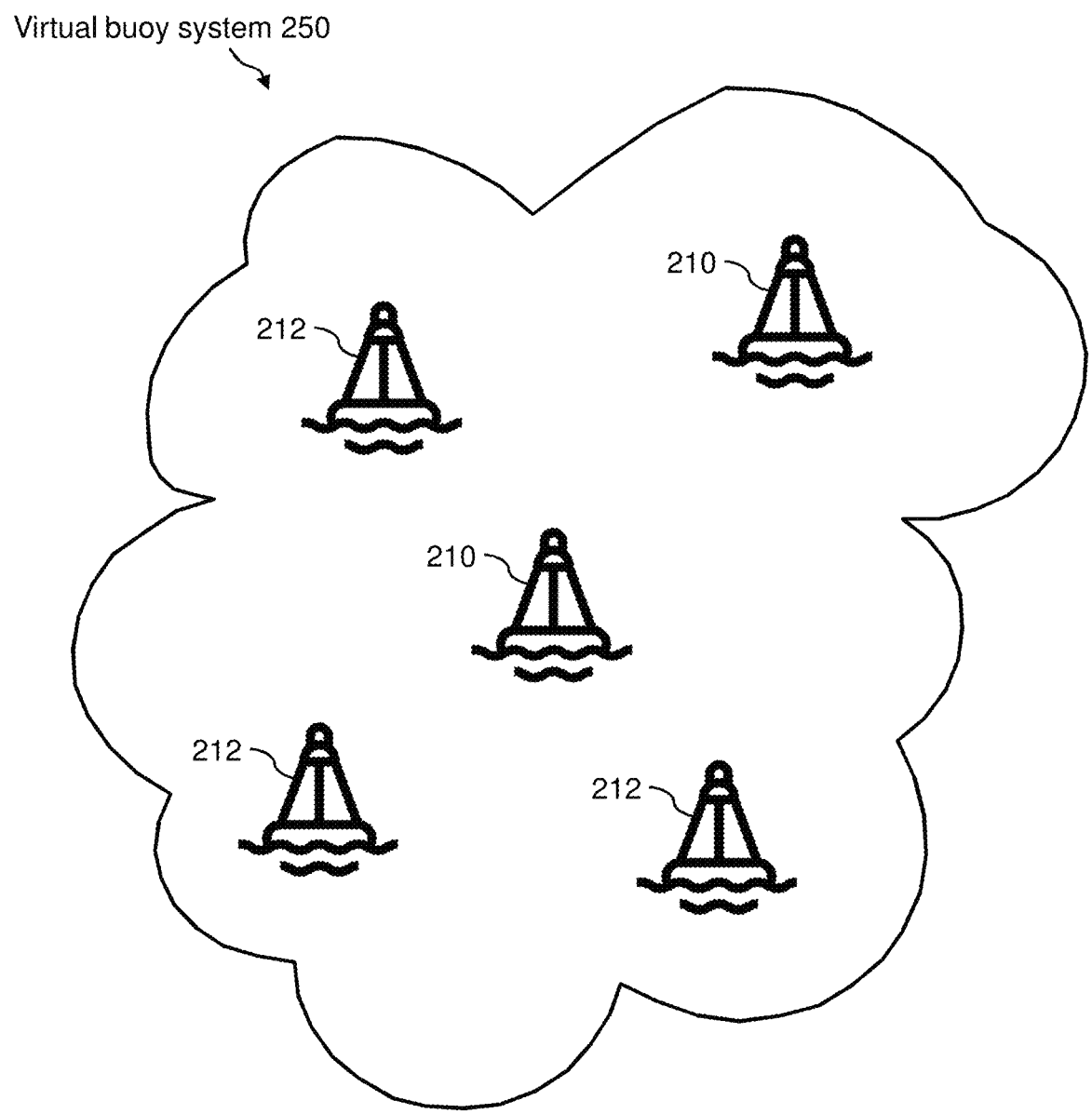
Figure 23:
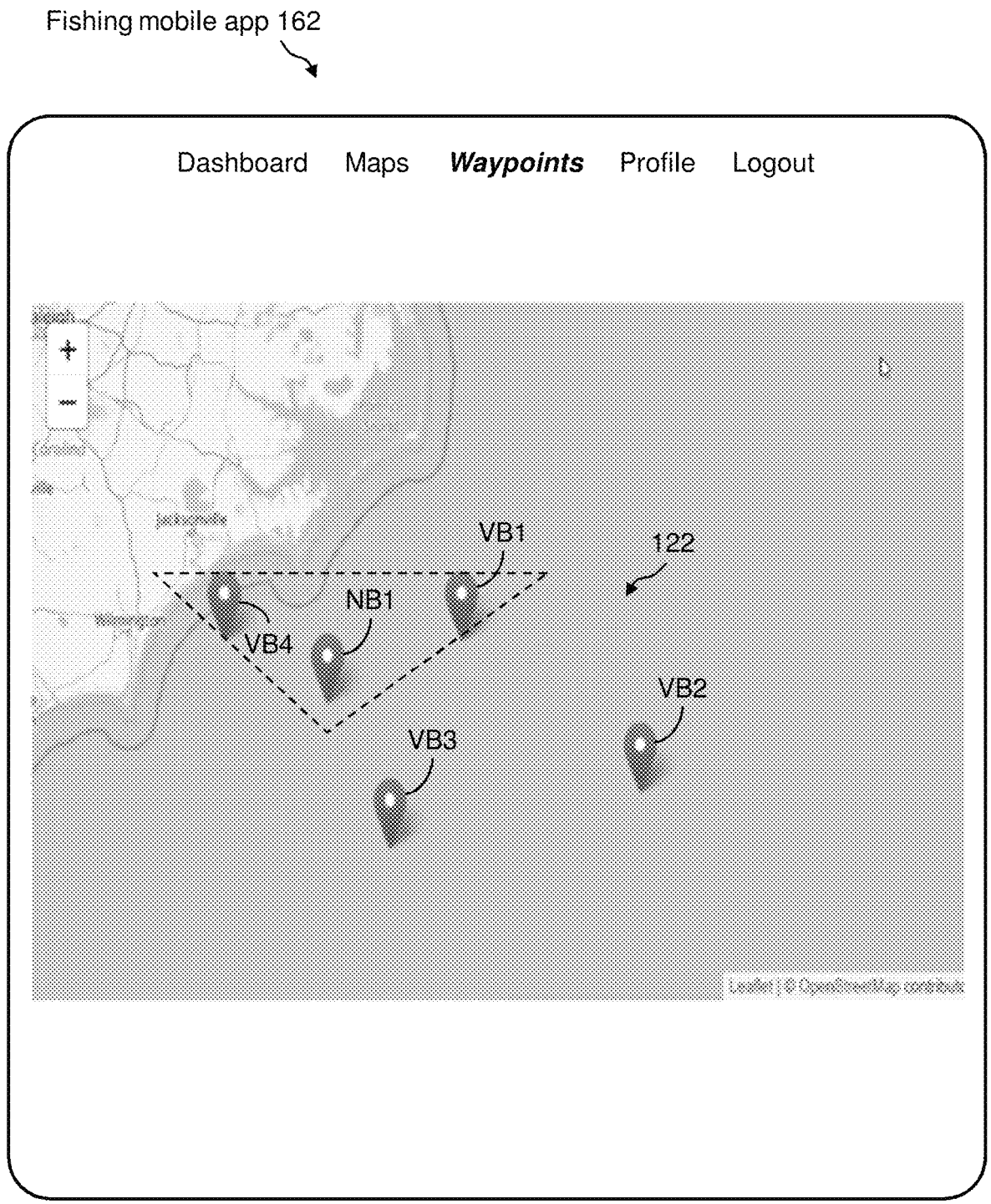
Figure 24:
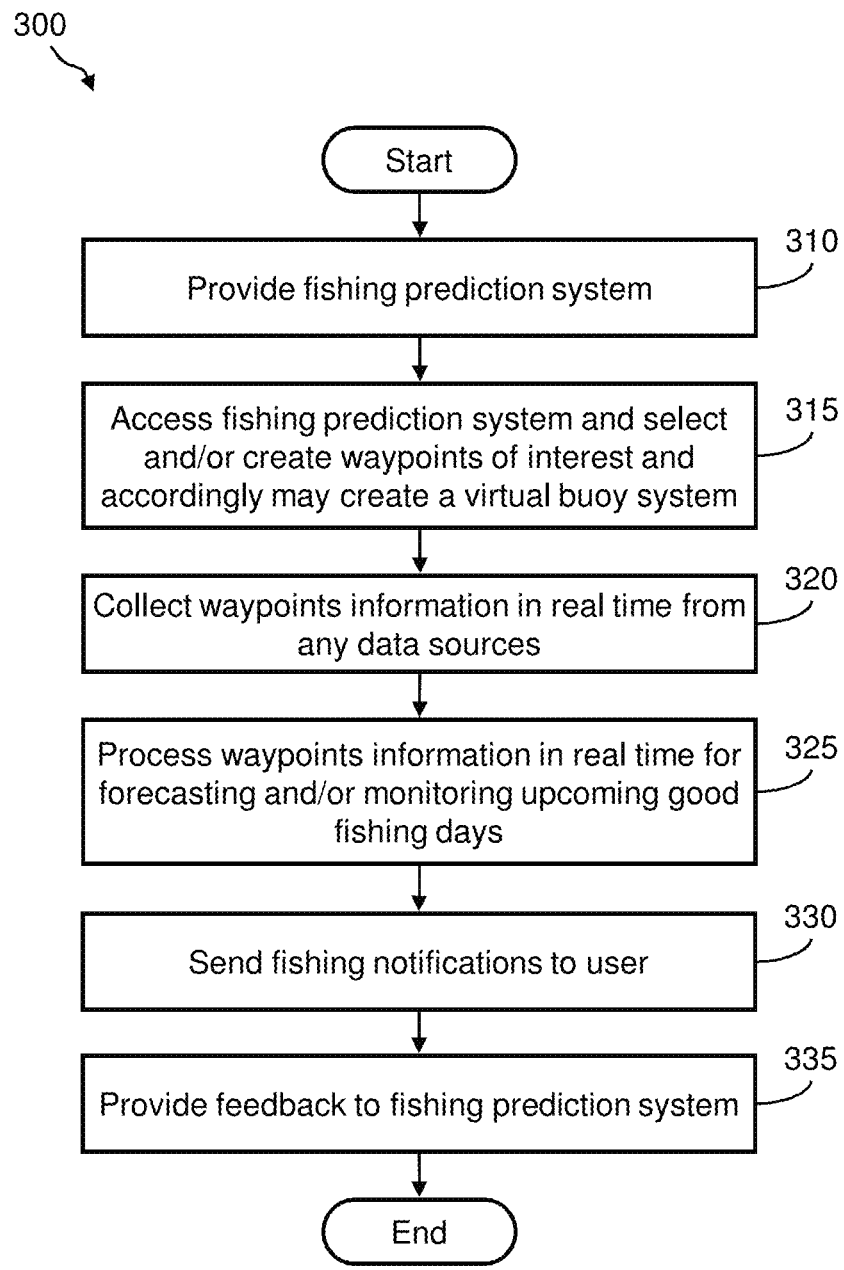

Having thus described the subject matter of the invention in general terms, reference will now be made to the accompanying drawings, which are not necessarily drawn to scale, and wherein:

FIG. 1 illustrates a block diagram of an example of a fishing and hunting prediction system including waypoints and utilizing personalized user attributes, in accordance with an embodiment of the invention;

FIG. 2 illustrates a block diagram of an example of types of waypoints of the fishing and hunting prediction system shown in FIG. 1, in accordance with an embodiment of the invention;

FIG. 3 illustrates a schematic diagram of an example of a virtual buoy system that may be created using and within the fishing and hunting prediction system shown in FIG. 1 and FIG. 2, in accordance with an embodiment of the invention;

FIG. 4 through FIG. 23 illustrate various example views and/or screenshots of an example of a fishing and hunting web application of the fishing and hunting prediction system instantiated as a mobile app of the fishing and hunting prediction system shown in FIG. 1 and FIG. 2, in accordance with an embodiment of the invention; and FIG. 24 illustrates a flow diagram of an example of a method of using the fishing and hunting prediction system including a waypoint system and utilizing personalized user attributes, in accordance with an embodiment of the invention.

DETAILED DESCRIPTION

The subject matter of the invention now will be described more fully hereinafter with reference to the accompanying drawings, in which some, but not all embodiments of the subject matter of the invention are shown. Like numbers refer to like elements throughout. The subject matter of the invention may be embodied in many different forms and should not be construed as limited to the embodiments set forth herein; rather, these embodiments are provided so that this disclosure will satisfy applicable legal requirements. Indeed, many modifications and other embodiments of the subject matter of the invention set forth herein will come to mind to one skilled in the art to which the subject matter of the invention pertains having the benefit of the teachings presented in the foregoing descriptions and the associated drawings. Therefore, it is to be understood that the subject matter of the invention is not to be limited to the specific embodiments disclosed and that modifications and other embodiments are intended to be included within the scope of the appended claims.

In some embodiments, the subject matter of the present invention provides a fishing and hunting prediction system and method including waypoints (including virtual buoys) and utilizing personalized user attributes.

In some embodiments, the fishing and hunting prediction system and method may be applicable to, for example, offshore, inshore, freshwater, saltwater fishing, hunting, and/or other like activities.

In some embodiments, the fishing and hunting prediction system and method may be implemented using a client-server architecture in which a server-based fishing and hunting prediction application may be running on an application server and a client-based fishing and hunting prediction application (e.g., a fishing prediction mobile app) may be running on a networked user computer and wherein the client-based fishing and hunting prediction application is the counterpart to the server-based fishing and hunting prediction application.

In some embodiments, the fishing and hunting prediction system and method may provide a fishing and hunting monitoring and forecasting system, which may be a personalized fishing and hunting analytics tool for saltwater (inshore/offshore) fisherman, freshwater fishermen, and/or hunters.

In some embodiments, the fishing and hunting prediction system and method may utilize multiple types of data, such as, but not limited to, satellite data (e.g., sea surface temperature, altimetry, currents, bathymetry, chlorophyll/plankton), forecast weather data (e.g., wind, wave, weather), tides, astronomy, and/or other data of interest and wherein the data may be processed with respect to the personal preferences (called attributes) of the user.

In some embodiments, the fishing and hunting prediction system and method may provide a waypoint system, which may include "virtual buoys" that can pull data from different sources like forecast data providers (forecasted) and satellite data providers (near real-time data readings) to provide data that users may use to plan out a fishing and hunting trip and wherein the data may be use to (1) provide daily forecasts and (2) look forward and forecast upcoming good fishing and hunting days based on the user's configured attributes.

In some embodiments, the fishing and hunting prediction system and method may provide a waypoint system that may include, but is not limited to, any number and/or combinations of virtual buoys (virtually marking specific locations) and/or NOAA buoys (i.e., actual buoys).

In some embodiments, the fishing and hunting prediction system and method may provide the ability to build a monitoring and forecasting model based on (1) an individual user profile and (2) a waypoint system.

In some embodiments, the fishing and hunting prediction system and method may provide a web-based fishing and hunting prediction application and/or a fishing and hunting prediction mobile app by which users may create, upload, and/or manage waypoints (i.e., any geographic locations of interest) that may be used for forecasting fishing and hunting days and routes and wherein the waypoints may include, but are not limited to, actual buoys (e.g., NOAA buoys), virtual buoys, fish sites, wreck sites, rocks sites, ledge sites, sandbar sites, hunting sites, bodies of water, fields, trails, and/or any other specific locations, and the like.

In some embodiments, the fishing and hunting prediction system and method may provide a fishing and hunting prediction application that utilizes an analytics engine that includes modern machine learning, analytics, and data modeling capabilities to capture various data inputs from waypoints (e.g., actual buoys, virtual buoys), forecasts, and/or actual user input that allows the models to continuously improve overtime.

Additionally, a method of using the fishing and hunting prediction system including a waypoint system and utilizing personalized user attributes is provided.

For the ease of describing the subject matter of the invention it is discussed below in the manner of a fishing prediction system and method. However, the subject matter of the invention may further apply to other activities, such as hunting. In that regard, the system and method as described herein, would operate in essentially the same manner as a hunting prediction system and method as it would a fishing prediction system and method.

Referring now to FIG. 1 is a block diagram of an example of a fishing prediction system 100 including virtual buoys and utilizing personalized user attributes, in accordance with an embodiment of the invention. Fishing prediction system 100 may be applicable to, for example, offshore, inshore, freshwater, and/or saltwater fishing. In this example, fishing prediction system 100 may be provided in a networked computing configuration that includes a fishing prediction application 110 and a data store 140 running on an application server 150.

At application server 150, fishing prediction application 110 may further include a user interface (UI) module 112, an authentication module 114, a security module 116, a profile module 118, a weather module 120, a waypoint module 122, a satellite module 124, an astronomy module 126, a tides module 128, and a fishing (and/or hunting) analytics module 130 (e.g., analytics monitoring and forecasting module). Further, fishing analytics module 130 may be informed by feedback 132 (e.g., user feedback) for machine learning purposes to improve accuracy.

Further, user account data 142 including personalized user attributes 144 may be stored at data store 140. Additionally, application server 150 may be accessible via a network 155. Network 155 may be, for example, a local area network (LAN) and/or a wide area network (WAN) for connecting to the Internet or to an Intranet. Application server 150 may connect to network 155 by any wired and/or wireless means. For example, application server 150 may include a communications interface 148.

A plurality of users 105 may be associated with the fishing prediction system 100. In one example, users 105 of fishing prediction system 100 may be fishermen interested in being informed in real time when good fishing conditions may exist. Further, users 105 may be any saltwater (inshore/offshore) and/or freshwater fishermen. The users 105 may access fishing prediction application 110 at application server 150 via their respective user computers 160 and network 155. User computers 160 may be any computing device, such as, but not limited to, a desktop computer, a laptop computer, a handheld computing device, a mobile phone (or smart phone), a tablet device, a smartwatch, and/or the like. Any information about users 105 may be stored in user account data 142 at data store 140 of application server 150. User account data 142 may include, for example, account information, user name, user group name, user/group credentials, user payment information, and the like. Further, a user profile (see FIG. 6) for each user 105 may be generated using profile module 118 and stored in user account data 142.

Further, user attributes 144 may be set by each user 105 and thus may be personalized to the user 105's preferences. Each user attribute 144 may specify a certain condition, parameter, and/or setting. Examples of user attributes 144 may include, but are not limited to, the following.

Wind measurements (knots/mph)—User sets preferred way of displaying wind speed measurements;

Units of Distance (feet/meters)—User sets preferred way of displaying distances;

Virtual Buoys (latitude/longitude)—Identifies a specific waypoint, area, or location the user desires to monitor/forecast;

Sea Surface Temperature (SST) Range (degrees C./F)—User sets preferred range of SST (e.g., min SST, max SST). This value may be used by fishing analytics module 130 (i.e., analytics) for monitoring/forecasting;

Max Wave Height (feet/meters)—User sets maximum wave height they are willing to fish in. This value may be used by fishing analytics module 130 (i.e., analytics) for monitoring/forecasting;

Max Wind Speed (knots/mph)—User sets maximum wind speed they are willing to fish in. This value may be used by fishing analytics module 130 (i.e., analytics) for monitoring/forecasting;

Current Flow (speed (knots/mph) and direction (N/S/E/W/NE/NW/SE/SW))—User sets preferred current speed range (e.g., min speed, max speed) and direction;

Water chlorophyll level—The concentration of chlorophyll is an indicator for the amount of photosynthetic plankton and/or phytoplankton present in a body of water. Based on the satellite data received, the levels of chlorophyll in the water may be expressed graphically on the map, for example, represented by colors on the map;

Water Depth (feet/meters)—User sets preferred water depth (e.g., min depth, max depth) for their fishing. This value may be used by fishing analytics module 130 (i.e., analytics) for monitoring/forecasting;

Wind Direction (N/S/E/W/NE/NW/SE/SW)—User sets preferred wind direction for their fishing. This value may be used by fishing analytics module 130 (i.e., analytics) for monitoring/forecasting;

Worst Wind Direction (N/S/E/W/NE/NW/SE/SW)—User sets least preferred wind direction for their fishing. This value may be used by fishing analytics module 130 (i.e., analytics) for monitoring/forecasting;

Moon Phases (new, quarter, half, three quarters, full)—Tracks the various moon phases. Moon phases play an important role in fishing and hunting. This data may be used as another attribute in the analytics engine (e.g., fishing analytics module 130);

Lure used (types of lures)—User identifies what lures that were used on a given fishing day. This data may be used as feedback 132 to fishing analytics module 130 (i.e., analytics);

Bait used (e.g., live bait, ballyhoo)—User sets the type of baits that they used on a given fishing day. Such things are live baits to things such as squid, ballyhoo, etc.;

Boat used (e.g., type, length, size)—User sets the type of boat they use to fish; and Actual Fishing Data—This may be a list of data the user can add to actual conditions (wind, wave, surface temps, etc.) and/or lures used, baits used, and so on. This information allows for actual data to be added and plugged into models for analytics.

In one example, users 105 may interact with the fishing prediction application 110 using UI module 112 at application server 150. In this example, UI module 112 may be a web-based UI that is accessible via network 155. For example, fishing prediction application 110 at application server 150 may be a software application that may be implemented as a web application and run in a web browser, such as Google Chrome or Microsoft Edge.

A fishing desktop application 162 or fishing mobile app 162 may be installed and running on each of the user computers 160. Fishing desktop application 162 and fishing mobile app 162 is hereafter called fishing mobile app 162. In this example, fishing mobile app 162 may be implemented, for example, as a .NET application, a desktop application, a mobile app, an application program interface (API), and the like known now or in the future.

When configured as a mobile app, fishing mobile app 162 may be designed to operate on any device platform, including for example, Windows, Android, Apple, and the like known now or in the future. Accordingly, users 105 may interact with the fishing prediction application 110 using fishing mobile app 162 of their user computer 160 (e.g., smart phone or tablet device). More details of an example of fishing mobile app 162 are shown and described hereinbelow with reference to FIG. 4 through FIG. 23.

Referring still to FIG. 1, fishing prediction system 100 may also include one or more data sources 170. Data sources 170 may include any sources of information that may be useful to fishing prediction application 110. Data sources 170 may include, for example, National Weather Service (NWS) 172, National Oceanic and Atmospheric Administration (NOAA) 174, the National Aeronautics and Space Administration (NASA) 176, and/or any other data sources 178 known now or in the future. Other data sources 178 may include, for example, any third-party entities that may process and provide information from NWS 172, NOAA 174, and/or NASA 176. Data sources 170 (e.g., NWS 172, NOAA 174, and/or NASA 176) may be accessible to fishing prediction application 110 via network 155.

NWS 172 is an agency of the United States federal government that is tasked with providing weather forecasts, warnings of hazardous weather, and other weather-related products to organizations and the public for the purposes of protection, safety, and general information.

NOAA 174 is an American scientific and regulatory agency within the United States Department of Commerce that forecasts weather, monitors oceanic and atmospheric conditions, charts the seas, conducts deep sea exploration, and manages fishing and protection of marine mammals and endangered species in the U.S. exclusive economic zone.

NASA 176 is an independent agency of the U.S. federal government responsible for the civilian space program, as well as aeronautics and space research. NASA 176 may be the source of satellite data, such as, but not limited to, satellite imagery and its related data.

Authentication module 114 of fishing prediction application 110 may be used to manage the authentication process of any entities of fishing prediction system 100, such as users 105 and any of the data sources 170. For example, when the user 105 signs into the fishing prediction application 110, a standard authentication process may be performed that allows the user 105 to access fishing prediction application 110. User-sign in may occur a number of ways. In one example, the user 105 may use a web browser to access UI module 112 of fishing prediction application 110 and enter credentials (e.g., username and password).

In another example, the user 105 may use fishing mobile app 162 of their user computer 160 to enter his/her credentials. In yet another example, the user sign-in process may occur automatically when the user 105 starts fishing mobile app 162. As users 105 are authorized to access fishing prediction system 100, user information may be stored in user account data 142 in data store 140.

Security module 116 of fishing prediction application 110 may be used to perform any system security functions with respect to keeping secure the contents of data store 140 and/or any other information with respect to fishing prediction system 100. Security module 116 may use standard security techniques, such as encryption, secure hashtags (or hash tags), and the like. Data store 140 may be, for example, data repositories (like databases) and/or flat files that can store data. Further, fishing prediction system 100 is not limited to one data store 140 only. Fishing prediction system 100 may include multiple data stores 140. Further, data store 140 may be provided on a data server that is separate from application server 150.

Again, profile module 118 may be a software component of fishing prediction application 110 that may be used to manage user profile information (see FIG. 6) that may be stored in user account data 142 of users 105.

Weather module 120 may be a software component of fishing prediction application 110 that may be used to manage any weather information received from data sources 170. For example, with respect to fishing prediction application 110, weather module 120 may be used to manage any weather information from NWS 172, NOAA 174, NASA 176, and/or any other weather information source.

Waypoint module 122 may be a software component of fishing prediction application 110 that may be used to manage any waypoints of fishing prediction application 110. Generally, a waypoint may be any geographic location of interest to any user 105. A waypoint may be specified via a GPS location (i.e., latitude, longitude location). Referring now to FIG. 2, in fishing prediction application 110 the types of waypoints may include, for example, NOAA buoys 210 (i.e., actual buoys), virtual buoys 212, fish sites 214, wreck sites 216, rocks sites 218, ledge sites 220, sandbar sites 222, other waypoint sites 224, and the like.

Waypoint module 122 may be used to upload, download, create, and/or delete any types of waypoints. Each waypoint may have certain data associated with it. For example, associated with each waypoint may be GPS information, weather information, wind information, wave information, water temperature and depth information, satellite information, astronomy information, tides information, and the like.

Referring now again to FIG. 1, satellite module 124 may be a software component of fishing prediction application 110 that may be used to manage any satellite information received from data sources 170. For example, with respect to fishing prediction application 110, satellite module 124 may be used to manage any satellite information from NWS 172, NOAA 174, NASA 176, and/or any other satellite information source.

Astronomy module 126 may be a software component of fishing prediction application 110 that may be used to manage any astronomical information, e.g., lunar information, received from data sources 170. For example, with respect to fishing prediction application 110, astronomy module 126 may be used to manage any lunar information (e.g., moon phase information) from NWS 172, NOAA 174, NASA 176, and/or any other astronomical information source.

Tides module 128 may be a software component of fishing prediction application 110 that may be used to manage any tides information received from data sources 170. For example, with respect to fishing prediction application 110, tides module 128 may be used to manage any tides information from NWS 172, NOAA 174, NASA 176, and/or any other tide information source.

Fishing analytics module 130 may be a software component of fishing prediction application 110 that may be used as the analytics engine for monitoring and forecasting the fishing conditions. Again, fishing analytics module 130 may be informed by feedback 132 for machine learning purposes to improve accuracy. Feedback 132 may be, for example, any feedback information provided by users 105 via fishing mobile app 162. Feedback 132 may include, for example, the degree of fishing success and/or fishing failure with respect to a given day's location and conditions. Feedback 132 may include things such as previous trip data consisting of tracking waypoints of where the user fished, previous weather, satellite, astronomy, tide data, and the like. Along with the degree of fishing success and what the fisherman used for bait.

Further, because any predictive system may rely on historical data, waypoint module 122 and/or fishing analytics module 130 may be used to process historical data. Accordingly, fishing prediction application 110 may provide and store all previous trip data associated with each user 105 in their user data 142 at data store 140. This historical data is valuable information that current systems do not have easy access to, other than the GPS unit on boats. In fishing prediction system 100, fishing prediction application 110 may be used to overlay this historical data on the maps. In this way, users 105 can see in real time where they have been tied to the data like SST, and so on.

Further, waypoint module 122 and/or fishing analytics module 130 may provide a "trip/track" feature wherein it records where the user 105 has fished and upload trip data.

Communications interface 148 at application server 150 may be any wired and/or wireless communication interface for connecting to a network (e.g., network 155) and by which information may be exchanged with other devices connected to the network. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, ISM, Bluetooth® technology, Bluetooth® Low Energy (BLE) technology, Wi-Fi, Wi-Max, IEEE 402.11 technology, ZigBee technology, Z-Wave technology, 6LoWPAN technology (i.e., IPv6 over Low Power Wireless Area Network (6LoWPAN)), ANT or ANT+ (Advanced Network Tools) technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols known now or in the future.

Referring still to FIG. 1, fishing prediction system 100 may operate in a client/server computing architecture, which is well known. In this example, fishing prediction application 110 at the application server 150 may be the server component of fishing prediction system 100, while fishing mobile app 162 at each of the user computers 160 may be the client component of fishing prediction system 100. In other words, fishing mobile app 162 at each of the user computers 160 is the counterpart to fishing prediction application 110 at application server 150.

Additionally, application server 150 may be any networked computing configuration as long as it is accessible via network 155 by other entities of fishing prediction system 100, such as users 105 and any of the data sources 170. For example, fishing prediction system 100, and more particularly the fishing prediction application 110 on application server 150, may support a cloud computing environment. In a cloud computing environment, application server 150 may be the cloud server. Further, fishing prediction application 110 is not limited to running on one application server 150 only. Fishing prediction system 100 may include multiple application servers 140 (or cloud servers) in order to ensure high-availability of computing resources.

Generally, and referring still to FIG. 1, fishing prediction application 110 may be a software application that provides a means of processing waypoint information in real time and then predict good fishing to users 105 based on their personalized user attributes 144. Fishing mobile app 162 provides the means for users 105 to interact with fishing prediction application 110. More specifically, using fishing mobile app 162 of fishing prediction application 110, users 105 may receive automatic notifications about fishing conditions. Likewise, using fishing mobile app 162, users 105 may return information to fishing analytics module 130 of fishing prediction application 110 for learning purposes.

Referring now to FIG. 3 is a schematic diagram of an example of a virtual buoy system 250 that may be created using and within the fishing prediction system 100 shown in FIG. 1 and FIG. 2. In this example, virtual buoy system 250 may include any number and/or combinations of NOAA buoys 210 (i.e., actual buoys) and/or virtual buoys 212. However, virtual buoy system 250 is not limited to NOAA buoys 210 and virtual buoys 212 only. In other embodiments, virtual buoy system 250 may include any number and/or combinations of NOAA buoys 210, virtual buoys 212, fish sites 214, wreck sites 216, rocks sites 218, ledge sites 220, sandbar sites 222, other waypoint sites 224, and the like. Examples of virtual buoy system 250 are shown and described hereinbelow with reference to FIG. 11 through FIG. 18.

Referring now to FIG. 4 through FIG. 23 is various views and/or screenshots of an example of fishing mobile app 162 of the fishing prediction system 100 shown in FIG. 1 and FIG. 2. While FIG. 4 through FIG. 23 show an example of fishing mobile app 162, it is understood the that same information may be provided using, for example, a web-based fishing desktop application 162.

Figure 4:
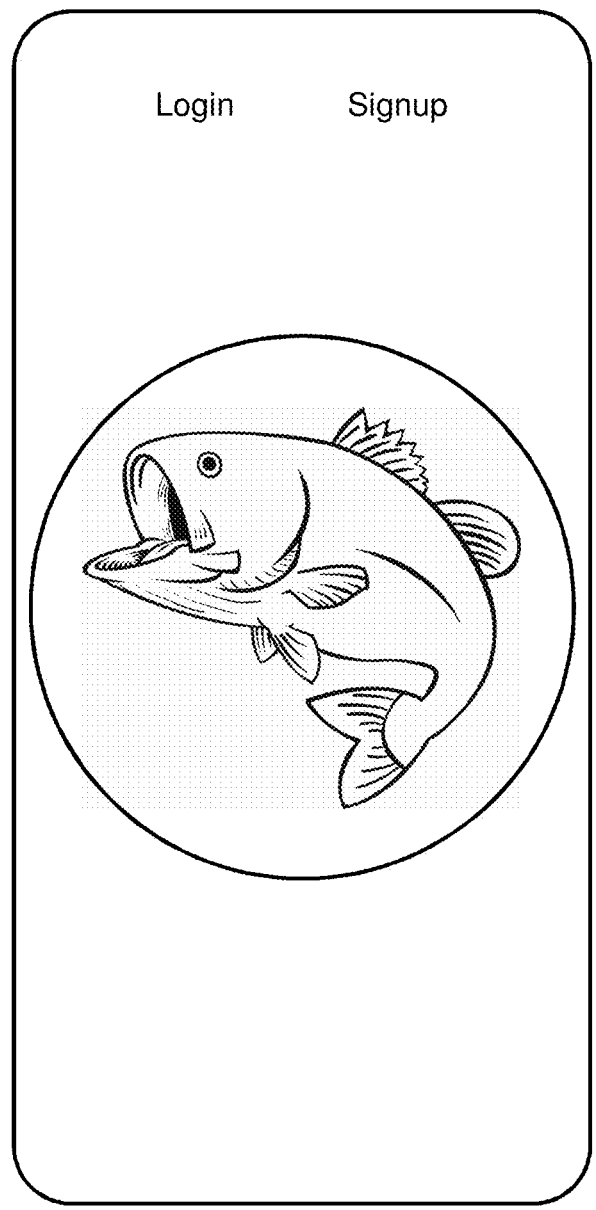
Figure 5:
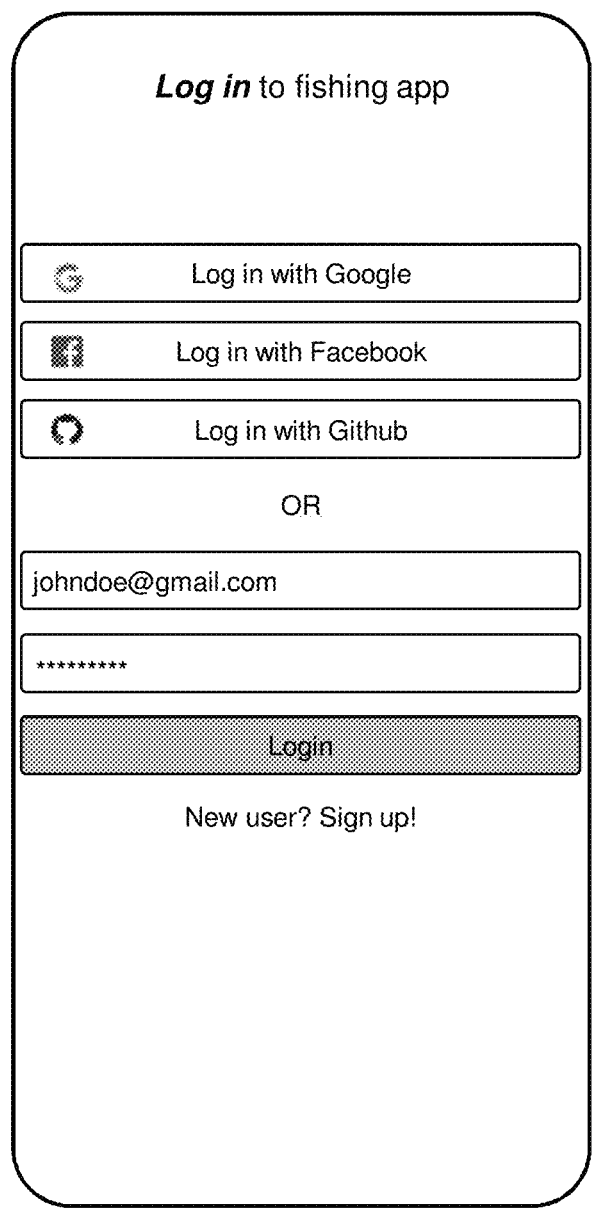
Figure 6:

For example, FIG. 4 shows an example of a home page of an example of the fishing prediction system instantiated as mobile app 162. FIG. 5 shows an example of a login page of fishing mobile app 162. FIG. 6 shows an example of a user profile page of fishing mobile app 162 by which a user may enter information that may be processed using profile module 118 of fishing prediction application 110. Generally, the user profile stores personal data like email, password, home address, as well as the user's personalized attributes. For example, user 105 may use the user profile page of fishing mobile app 162 to enter his/her personalized attributes that reflect their personal fishing preferences. In one example, a user 105 may set his/her wave information to max wave is 3 feet at not less than every 5 seconds.

Figure 7:
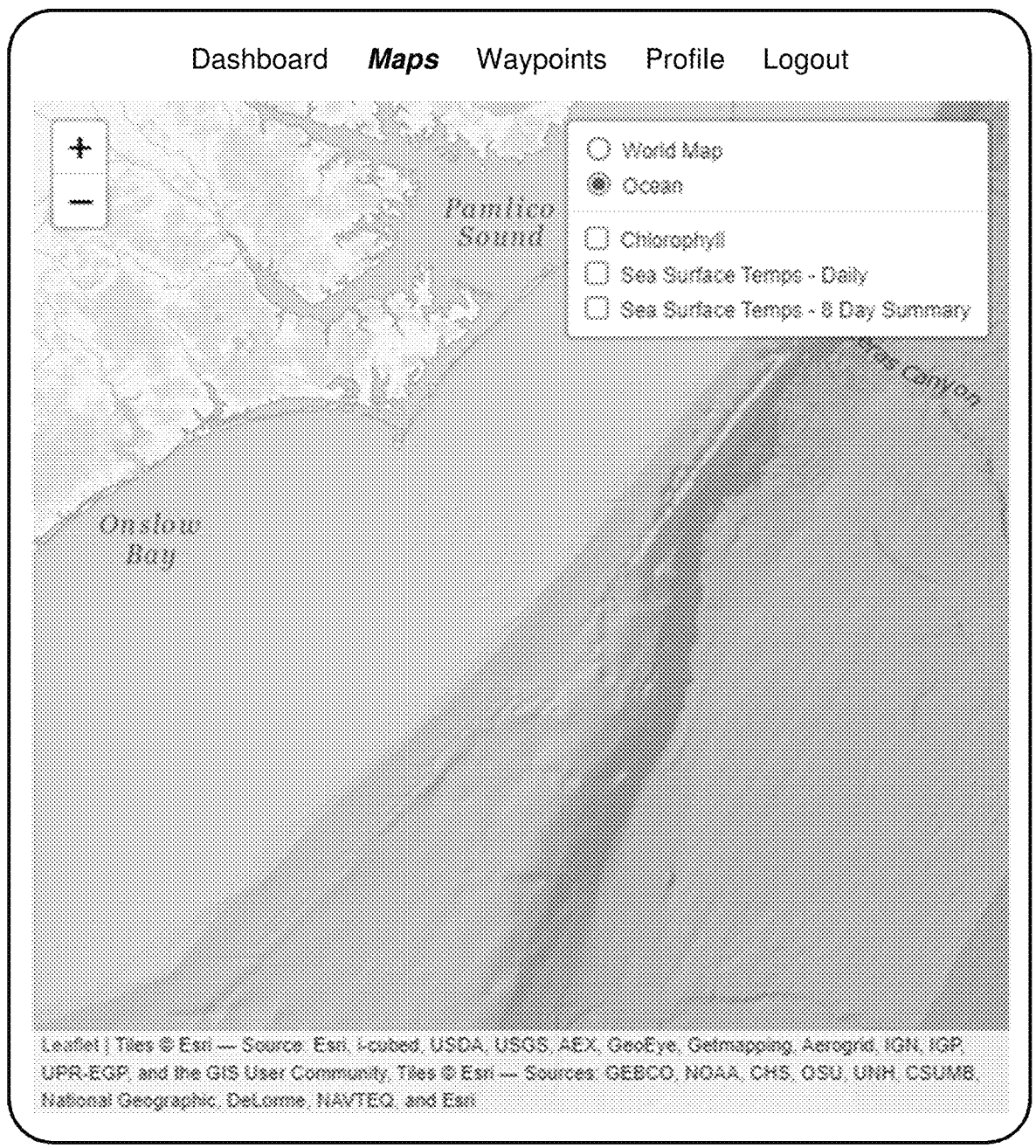
Figure 8:
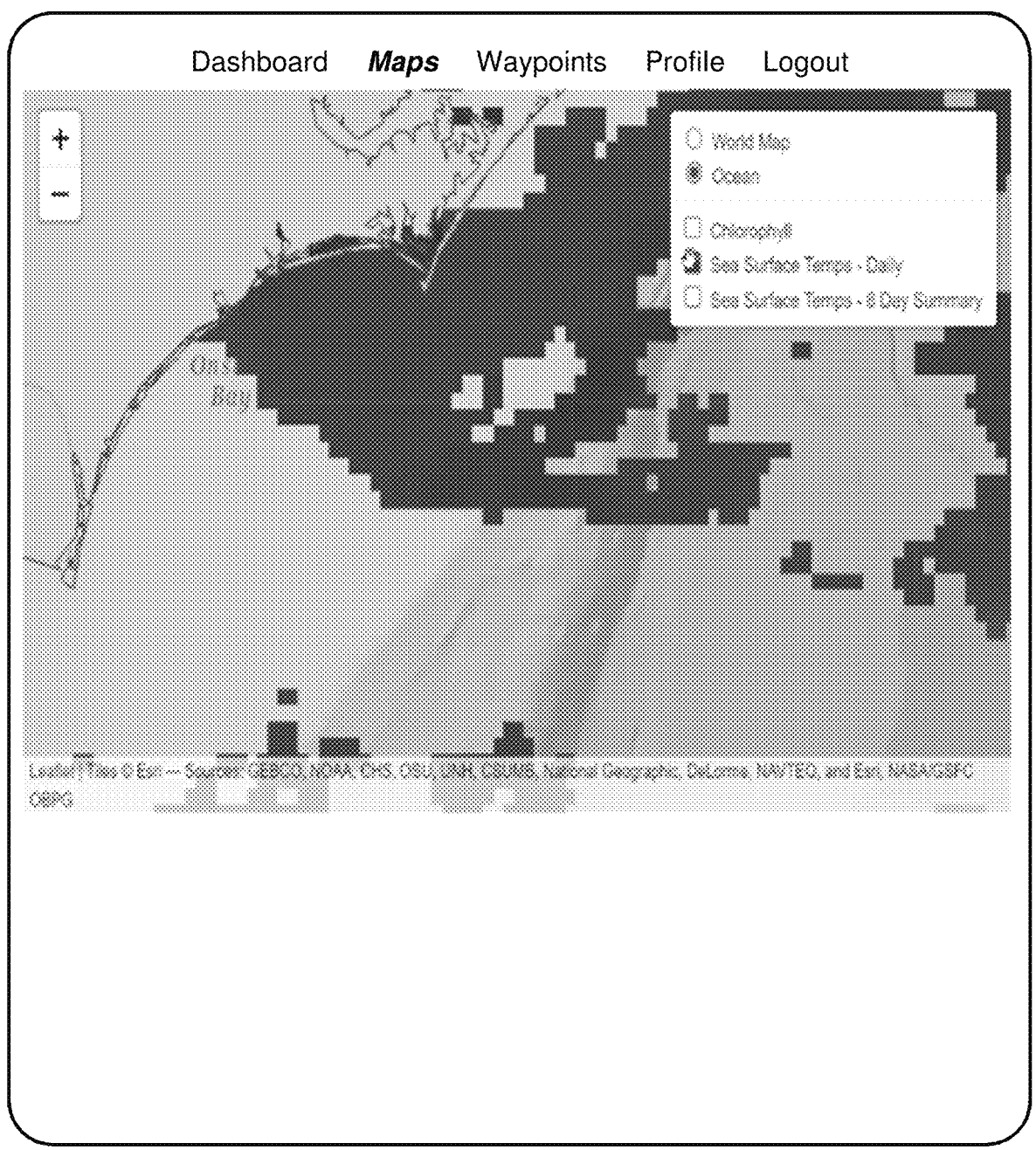
Figure 9:
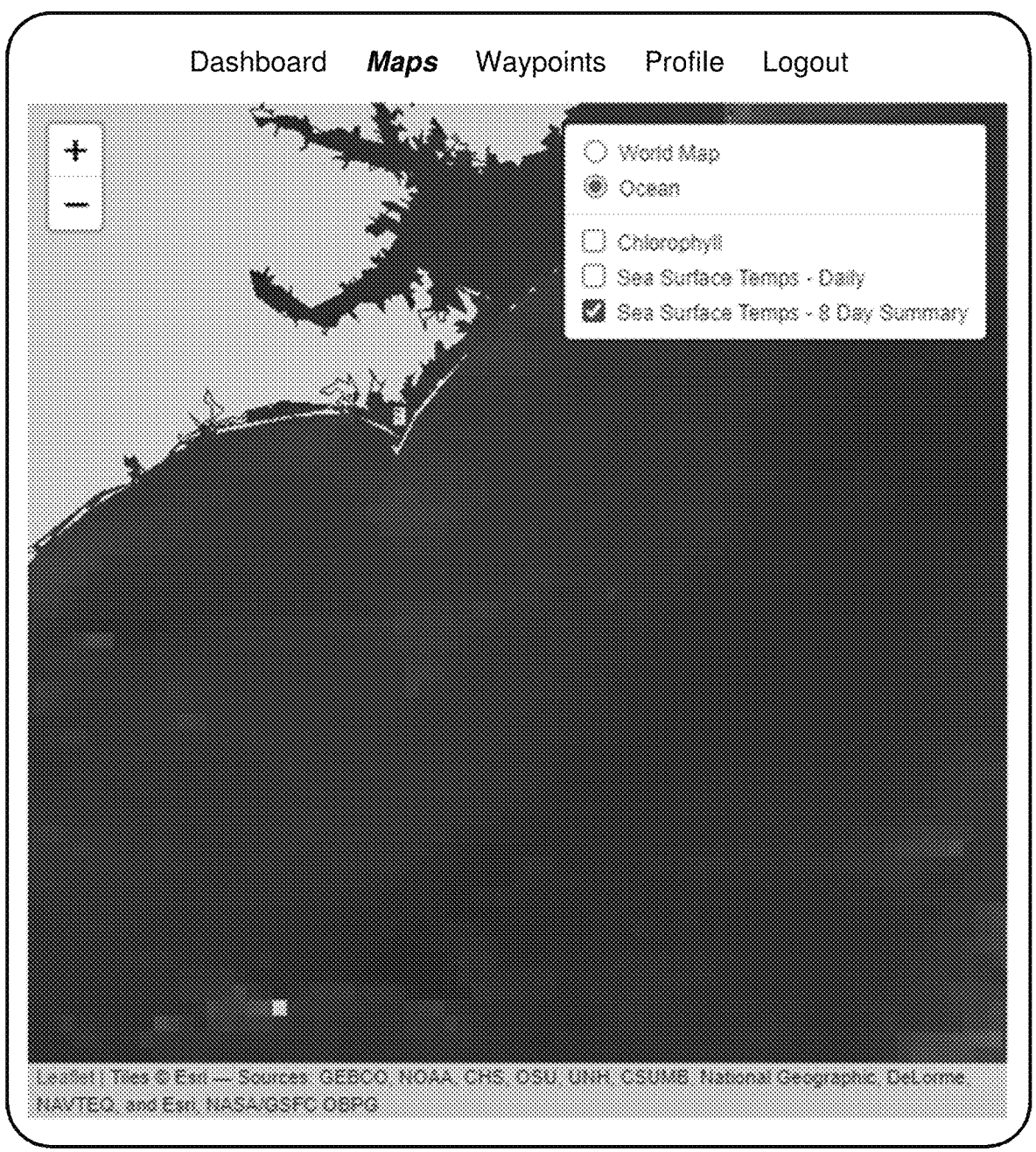

Further, FIG. 7 shows an example of a maps page of fishing mobile app 162. The maps page may be used to display various maps of any user selected geographic location and indicating, for example, sea surface temperature (SST), chlorophyll, altimetry, bathymetry, and the like. For example, the maps page may allow users 105 to drive overlays with parameters, such as changing the range of SST data they are targeting (e.g., daily or weekly SST). For example, FIG. 8 shows an example of daily SST and FIG. 9 shows an example of an SST 8-day summary. Additionally, using the maps page, fishing prediction application 110 may have the ability to overlay previous fishing trips.

FIG. 10 through FIG. 18 show examples of a managed waypoints and routes page of fishing mobile app 162. Generally, using the managed waypoints and routes page, users 105 may be used to import/export waypoints, create new waypoints, delete waypoints, edit waypoints, and the like. Information of managed waypoints and routes page may be processed using waypoint module 122 of fishing prediction application 110. In fishing mobile app 162, waypoints are associated with a certain user 105 and are not accessible by other users 105 unless the certain user 105 chooses to share. Using managed waypoints and routes page of fishing mobile app 162, users 105 may create the "virtual buoy" system that is applied to the prediction modeling.

Figure 10:
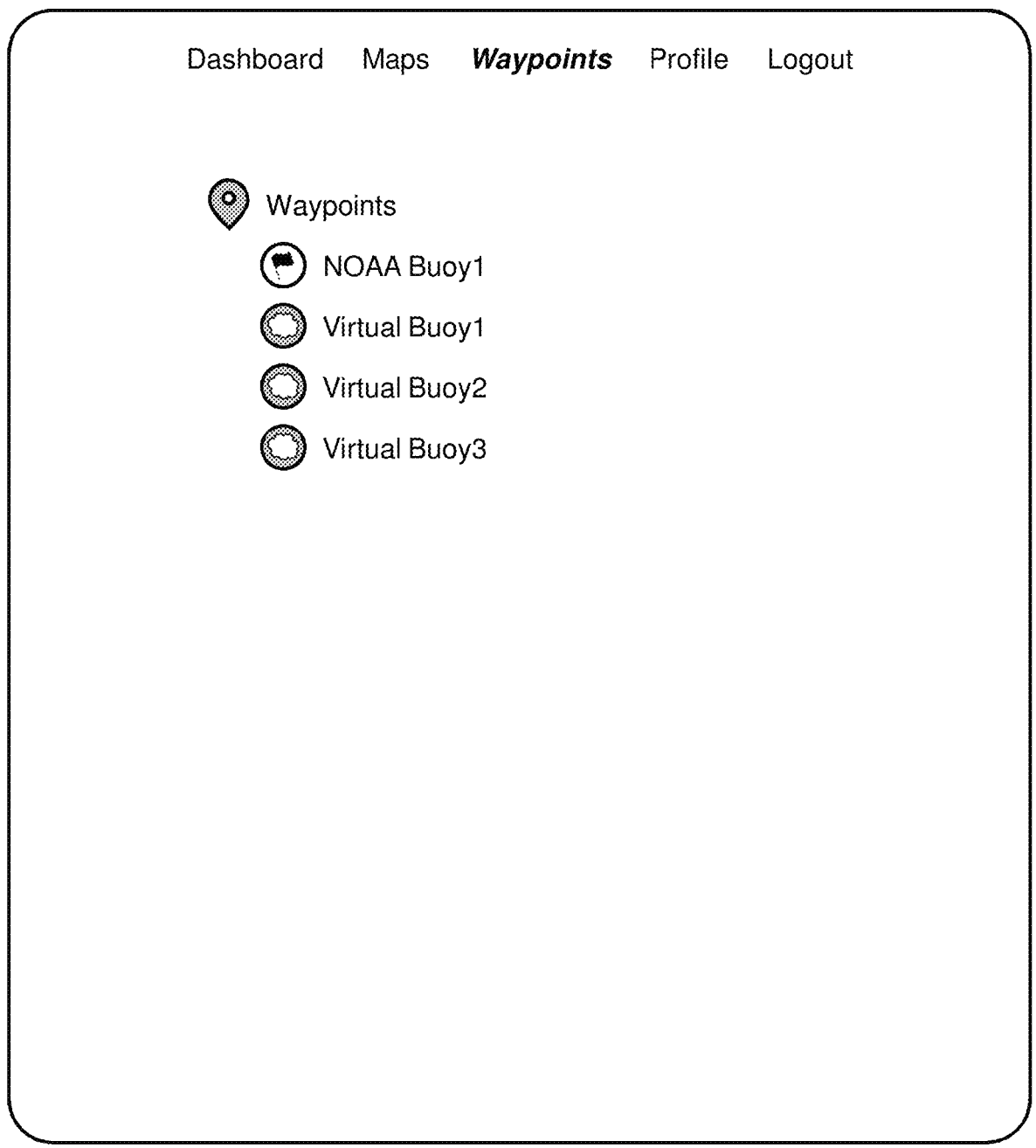
Figure 11:
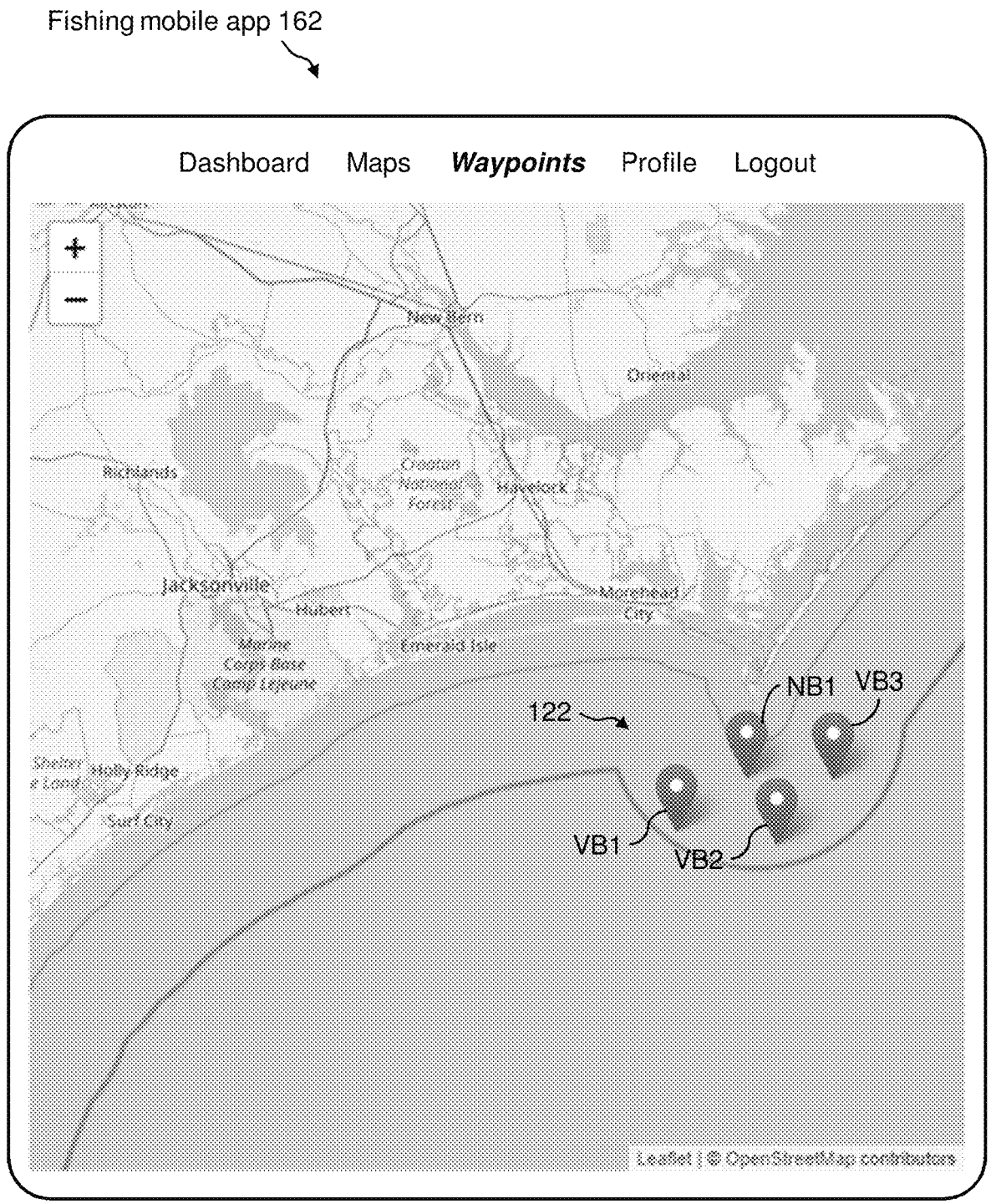
Figure 12:
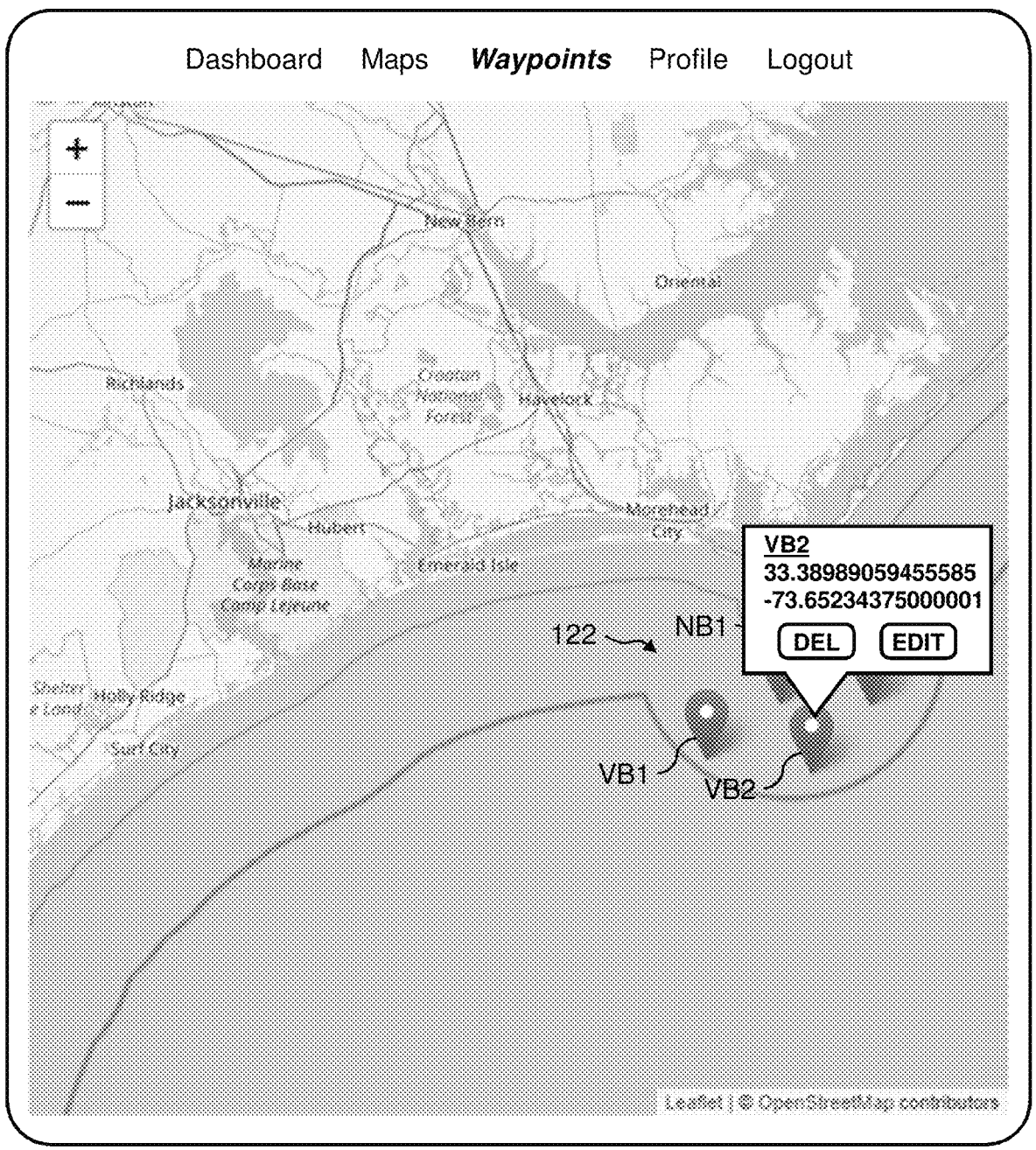
Figure 13:
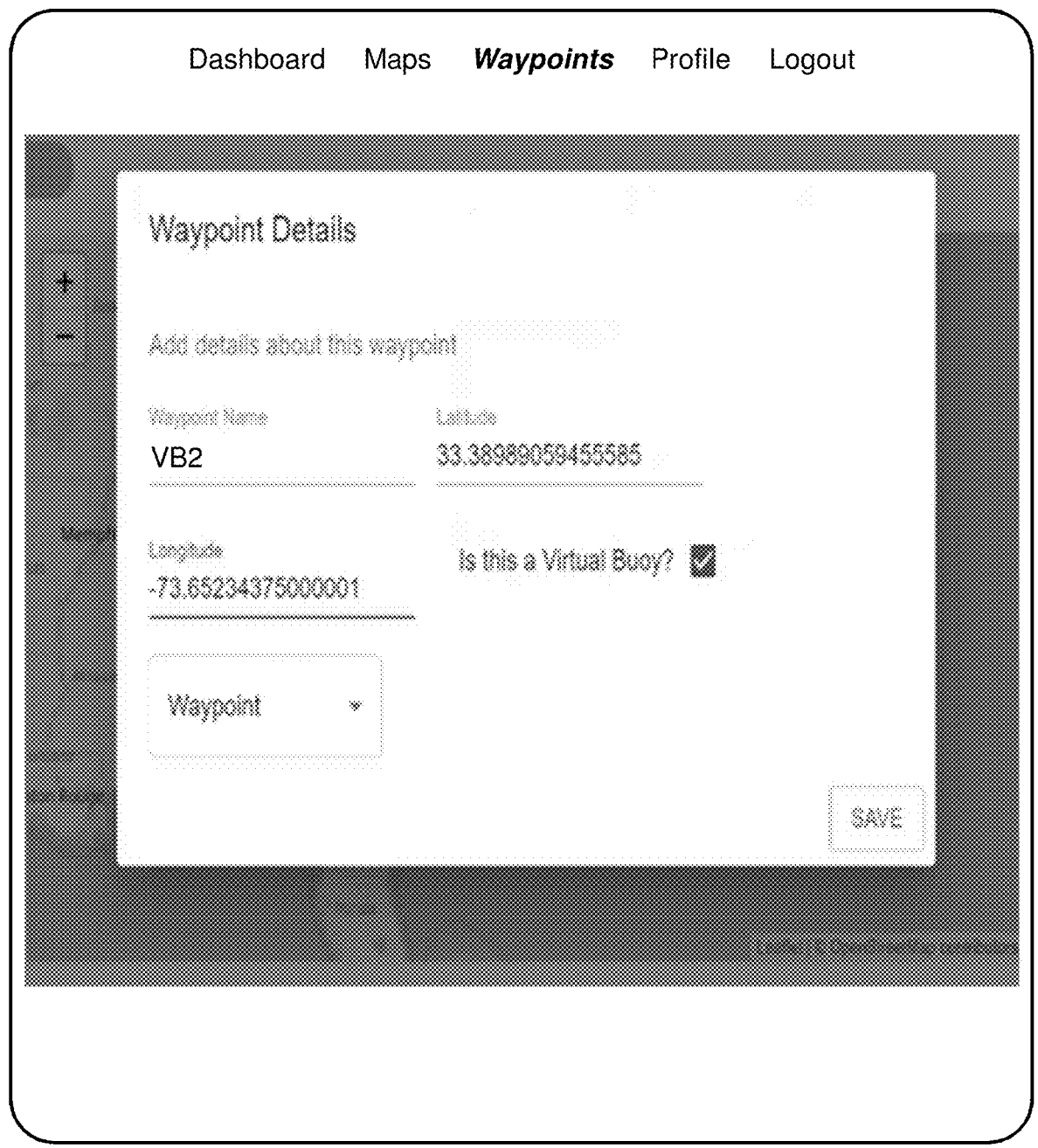
Figure 14:
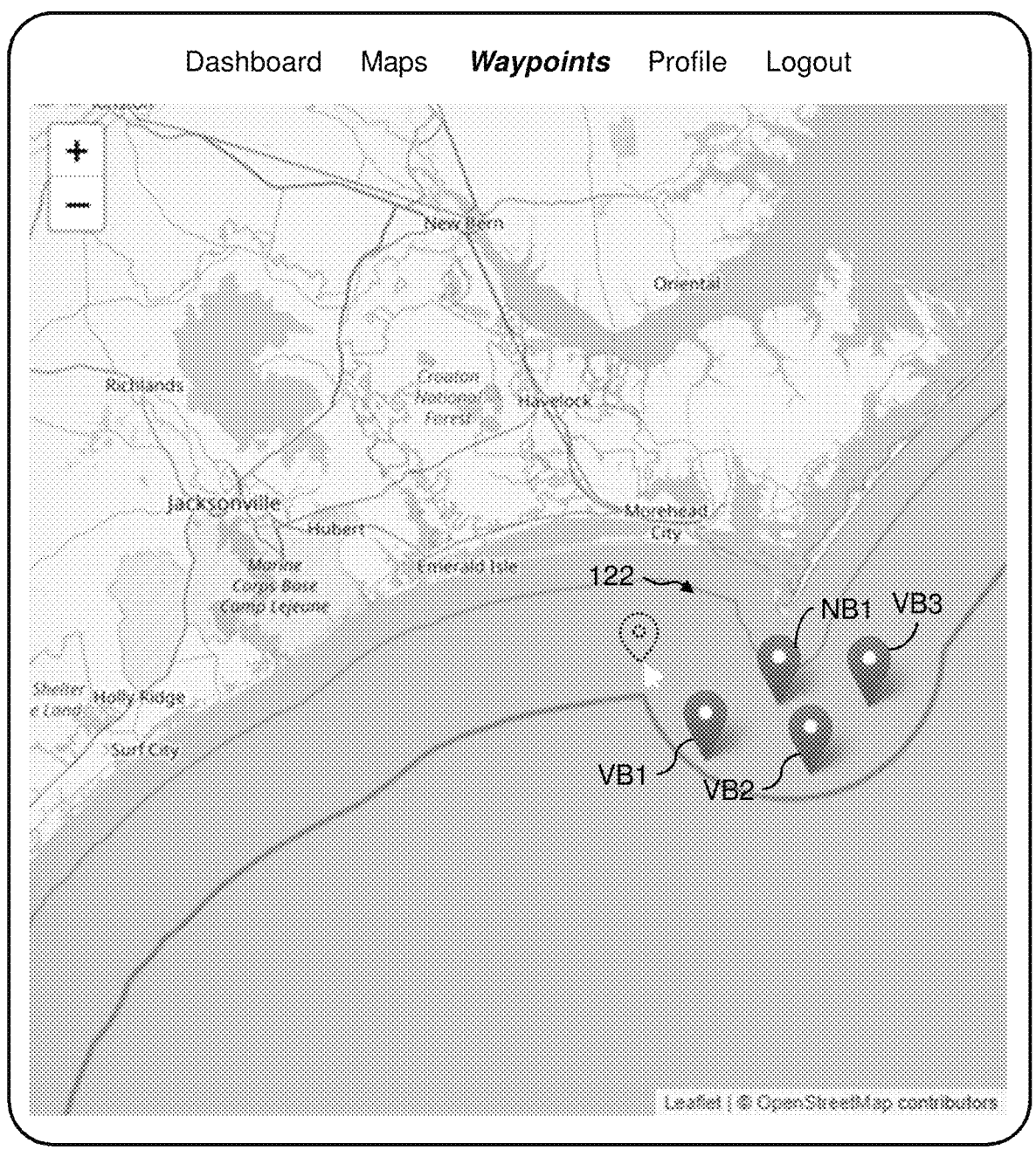
Figure 15:
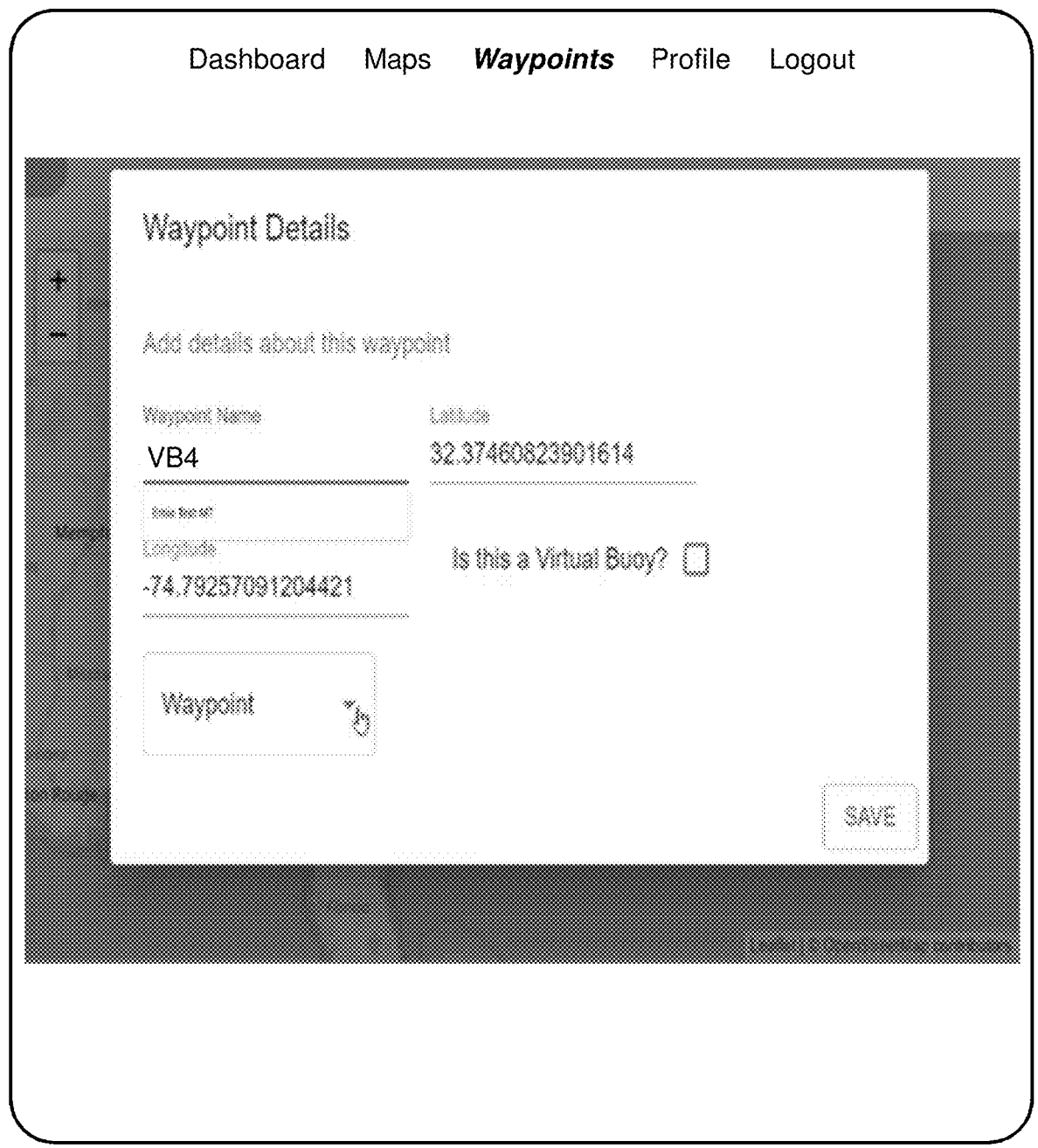
Figure 16:
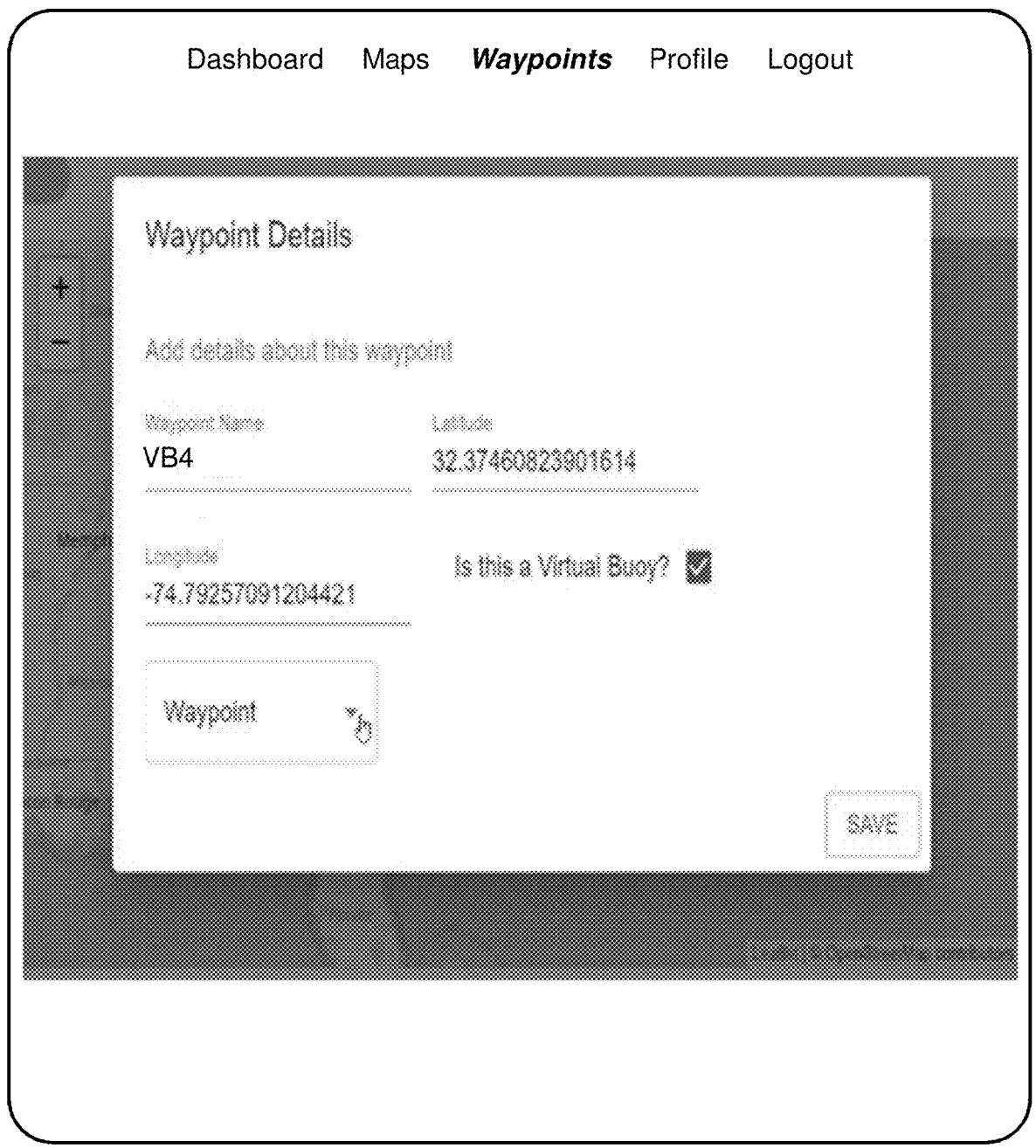

In one example, FIG. 10 shows a list of a certain user 105's waypoints. In this example, the waypoints include one NOAA buoy (e.g., NB1) and three virtual buoys (e.g., VB1, VB2, VB3). NB1 is an example of NOAA buoys 210 shown in FIG. 2. VB1, VB2, and VB3 are examples of virtual buoys 212 shown in FIG. 2. Further to the example, FIG. 11 shows NB1, VB1, VB2, and VB3 overlaid geographically on a map and wherein NB1 is an actual buoy and VB1, VB2, VB3 are virtual buoys that have been previously created by the user 105. Again, the waypoints are managed using waypoint module 122. FIG. 12 shows that, in one example, when hovering over a certain waypoint (e.g., VB2) a snapshot of information about the waypoint may be displayed. However, FIG. 13 shows that by selecting the waypoint, all information about the waypoint may be displayed. In this example, the waypoint details menu indicates that VB2 is a virtual buoy. Here, a user 105 may enter/edit the name the waypoint.

Figure 17:
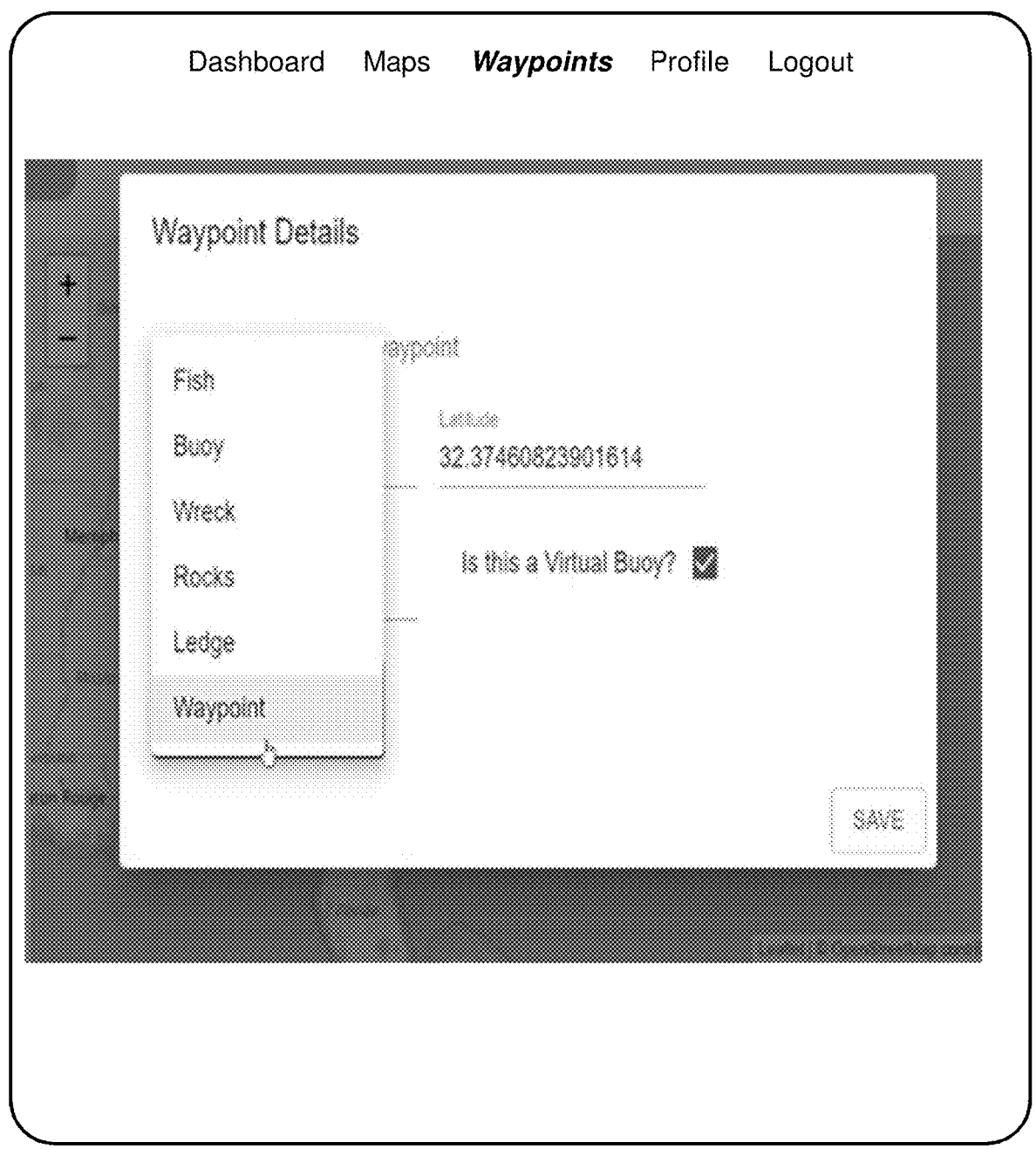
Figure 18:
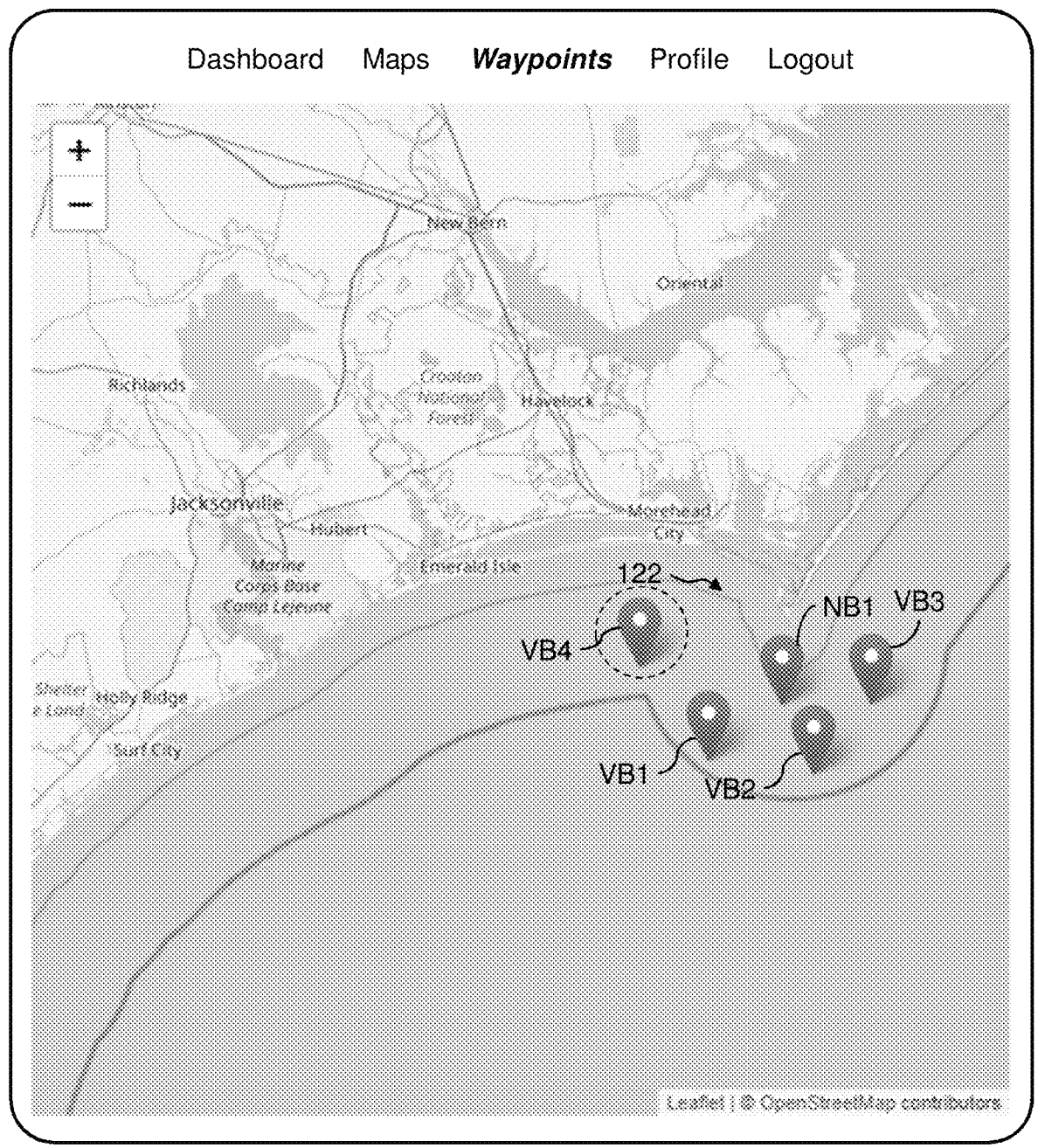

Further to the example, FIG. 14 through FIG. 18 show an example of using the managed waypoints and routes page of fishing mobile app 162 in a process of creating a virtual buoy 212. For example, a user 105 opens a beginning maps page. In this example, the map shows NB1, VB1, VB2, and VB3 previously described in FIG. 10 through FIG. 13. A user 105 may then click one any location on the map to initiate the creation of a new virtual buoy 212, in this case VB4. Next, and referring now to FIG. 15 and FIG. 16, the waypoint details menu is displayed showing the geographic location (latitude, longitude) of the virtual buoy 212. Here, user 105 may enter, for example, the waypoint name (e.g., VB4) and may select whether a virtual buoy (see FIG. 16). Further, FIG. 17 shows that the type of waypoint may be selected. Next, and referring now to FIG. 18, by selecting the "save" button on the waypoint details menu a new virtual buoy 212 (e.g., VB4) appears on the map.

Further to the example, the screenshots of fishing mobile app 162 shown in FIG. 11 through FIG. 18 show pictorially examples of virtual buoy system 250 shown in FIG. 3. Further, FIG. 11 through FIG. 18 show examples of creating a virtual buoy system 250.

Next, FIG. 19 through FIG. 23 shows an example dashboard page of fishing mobile app 162. In one example, the user 105's home page may be the dashboard for them to quickly see analyzed data, weather data, and forecasted data and monitor waypoints (e.g., NB1, VB1, VB2, VB3, VB4) for an easy access view of data. This dashboard page may show various data inputs from such things as graphs showing the various wave heights and periods (significant, wind, swell) overtime, currents, forecast summaries, to maps for visualizations. The information shown on the dashboard page may be driven from fishing analytics module 130 (i.e., the analytics/machine learning engine) based on user profile information (e.g., personalized user attributes) and/or the virtual buoy system.

Figure 19:
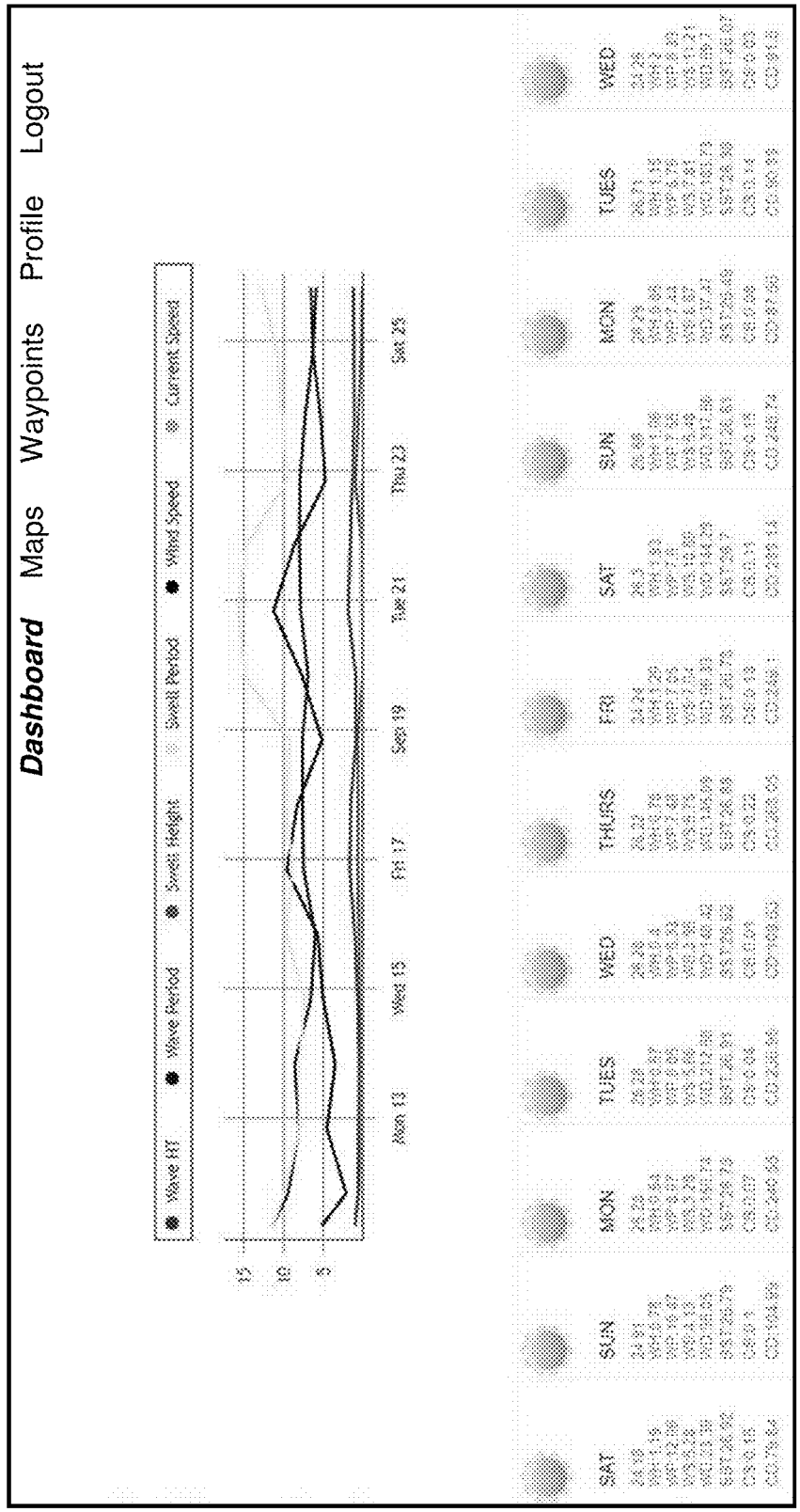
Figure 20:
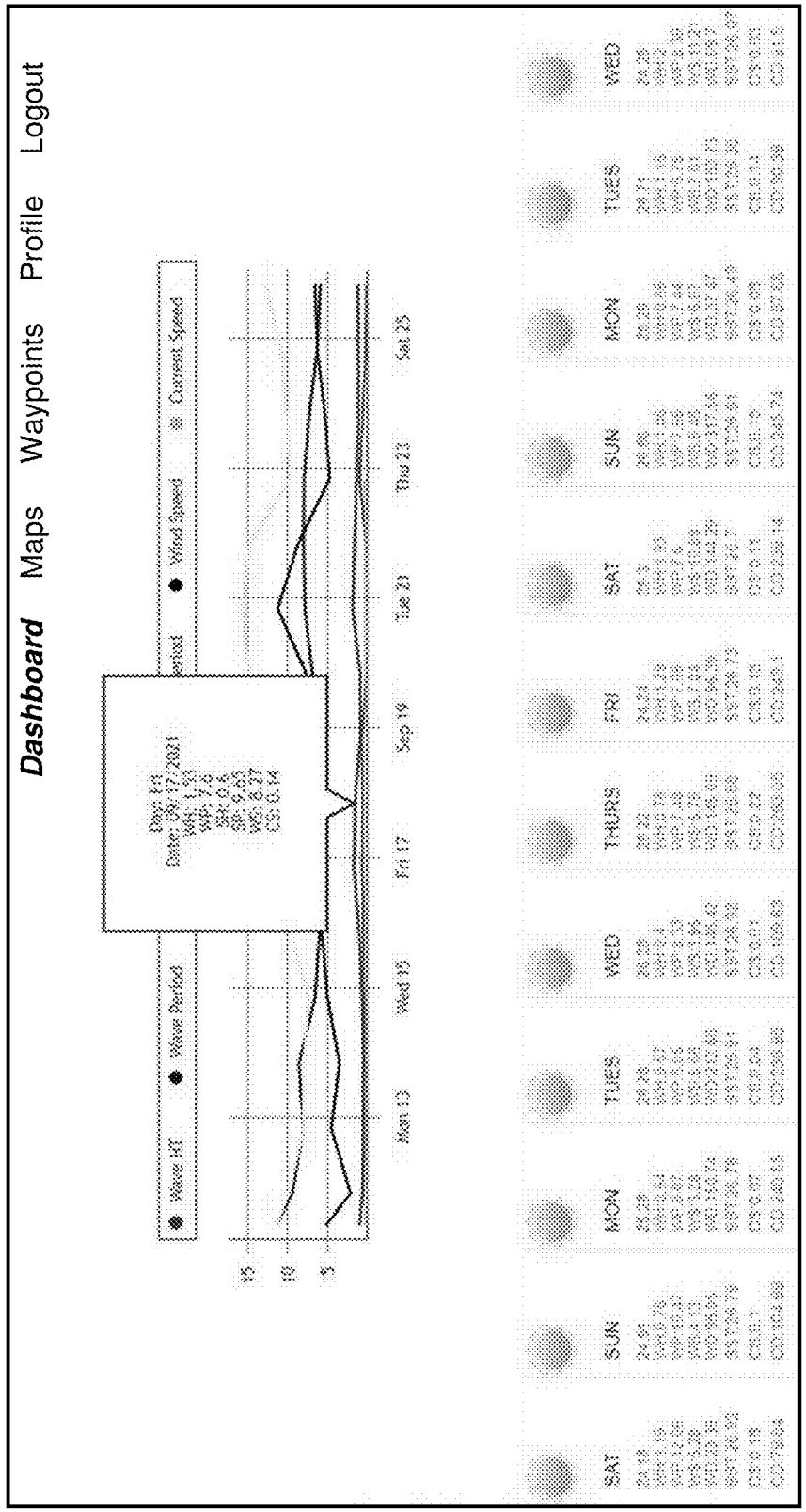
Figure 21:
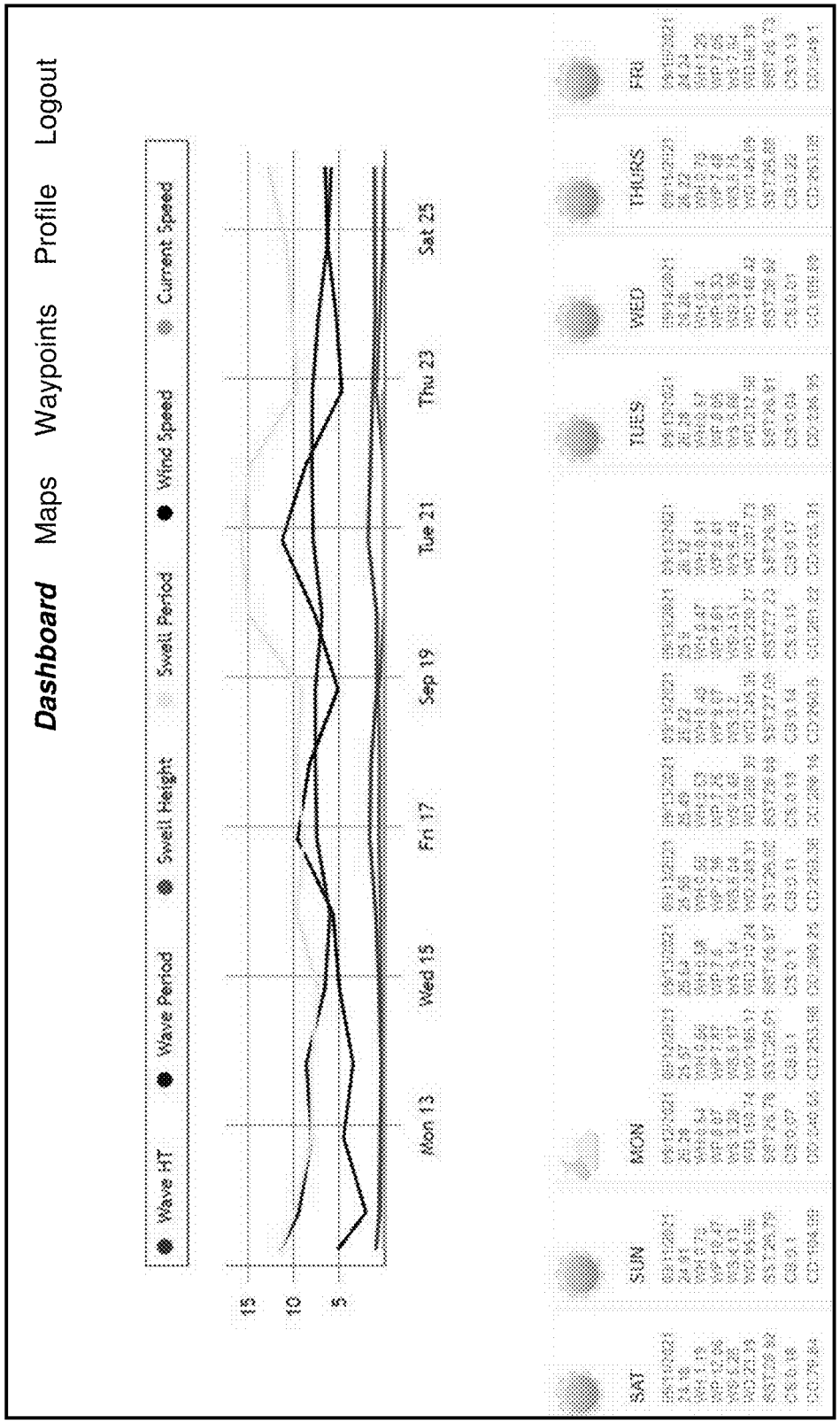
Figure 22:
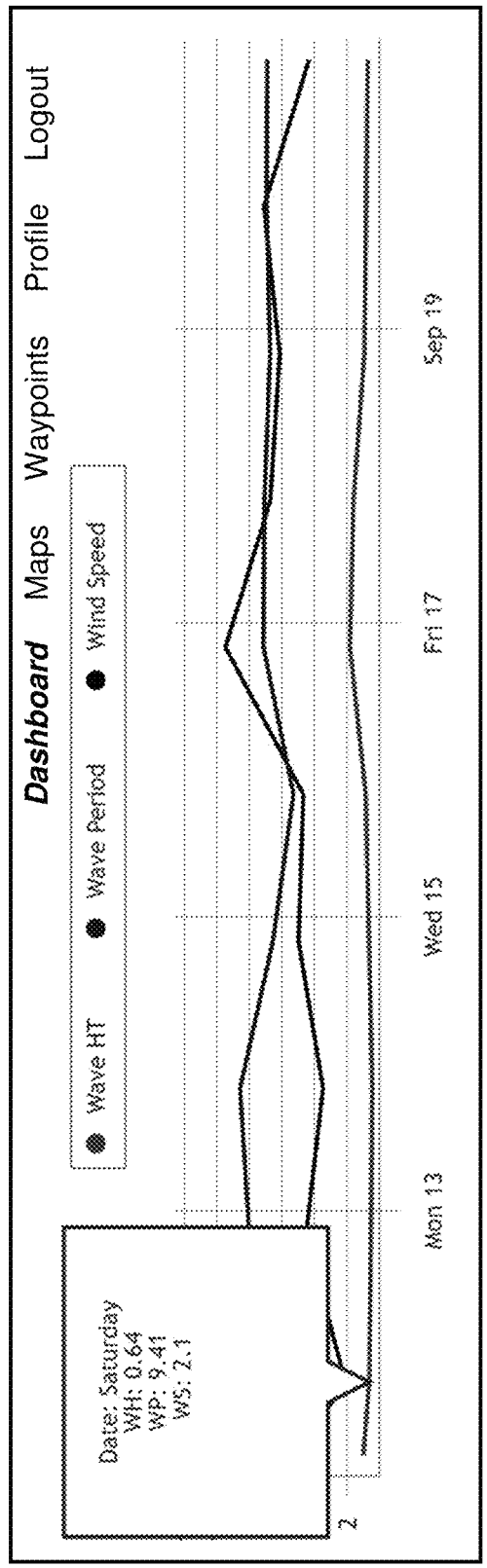

In FIG. 19, the graph may show, for example, the aggregate data across one or more waypoints (e.g., NB1, VB1, VB2, VB3, VB4). The dashboard page provides analytics data on forecasted days to fish. In one example, the data may show the aggregate of every 3 hours for 10 days across the user 105s waypoints. The graph may be, for example, an average of two or more closely located waypoints. FIG. 20 shows an example of a summary display by hovering over a certain curve. FIG. 21 shows an example of a further drill down of the data. FIG. 22 shows another example of the dashboard information. Further, in one example, FIG. 23 shows an example of three closely located waypoints (e.g., NB1, VB1, VB4) on a map showing six waypoints, and wherein the data from these closely located waypoints (e.g., NB1, VB1, VB4) may be averaged and displayed on the dashboard page of fishing mobile app 162.

With respect to fishing forecasting and monitoring in fishing prediction application 110 including fishing mobile app 162, based on the personalized user attributes and/or any other attributes for each waypoint (e.g., NOAA buoys 210, virtual buoys 212), fishing prediction application 110 will monitor data from, for example, current weather data, forecasting to satellite data and forecast upcoming potential upcoming good fishing days. The forecasting system can also monitor surrounding areas for other data features based on the personalized user attributes plus, for example, altimetry/sea surface height (SSH) to identify upwellings and down dwellings, sea surface temperatures (SSTs), currents, weather data to help locate potential good fishing spots near the any of the user 105s waypoints.

Further, in FIG. 19 through FIG. 23, the information of dashboard page of fishing mobile app 162 may be generated by accessing any and all data sources 170 with respect to all of the user 105's waypoints (e.g., NOAA buoys 210, virtual buoys 212).

FIG. 24 illustrates a flow diagram of an example of a method 300 of using the fishing prediction system including a virtual buoy system and utilizing personalized user attributes, in accordance with an embodiment of the invention. Method 300 may include, but is not limited to, one or more of the following steps, and may be conducted in a different order than indicated below.

At a step 310, a fishing prediction system is provided. For example, fishing prediction system 100 including fishing prediction application 110 and fishing mobile app 162 as described hereinabove with reference to FIG. 1 through FIG. 23 is provided.

At a step 315, the fishing prediction system is accessed and the user selects and/or creates waypoints of interest and accordingly a virtual buoy system is created. For example, using fishing mobile app 162, a certain user 105 may access fishing prediction application 110 of fishing prediction system 100. Then, the user 105 may select and/or create any waypoints of interest, such as, but not limited to, any NOAA buoys 210 and/or virtual buoys 212 in any bodies of water of interest. Accordingly, a virtual buoy system 250, such as shown in FIG. 3, may be created.

At a step 320, the waypoints information may be collected in real time from any data sources. For example, fishing prediction application 110 may be used to collect information from any waypoints of interest (e.g., NOAA buoys 210 and/or virtual buoys 212) in real time from any data sources 170, such as NWS 172, NOAA 174, and/or NASA 176.

At a step 325, the waypoints information is processed in real time for forecasting and/or monitoring upcoming good fishing days. For example, fishing analytics module 130 (i.e., the analytics/machine learning engine) of fishing prediction application 110 may be used to process in real time any waypoints information collected in step 320 for forecasting and/or monitoring upcoming good fishing days.

At a step 330, fishing notifications are sent to the user. For example, when fishing analytics module 130 identifies a potential good fishing day, a notification may be sent to the user 105 via fishing mobile app 162. Further, using ongoing analytics of data sources 170, any changes to the forecast may be pushed to the user 105.

At a step 335, feedback may be provided to fishing prediction system. For example, at any time, user 105 may provide feedback 132 to fishing analytics module 130 for the purpose of improved learning. Feedback 132 may be, for example, any feedback information provided by users 105 via fishing mobile app 162 and/or a web-based fishing desktop application 162. Feedback 132 may include, for example, the degree of fishing success and/or fishing failure with respect to a given day's location and conditions, the type of bait used, any actual conditions, and so on.

In summary and referring now again to FIG. 1 through FIG. 24, fishing prediction system 100 and method 300 including virtual buoys and utilizing personalized user attributes is provided. In one example, fishing prediction system 100 and method 300 may be applicable to, for example, offshore, inshore, freshwater, and/or saltwater fishing.

In some embodiments, fishing prediction system 100 and method 300 may be implemented using a client-server architecture in which server-based fishing prediction application 110 may be running on application server 150 and client-based fishing mobile app 162 may be running on a networked user computer 160 and wherein the client-based fishing mobile app 162 is the counterpart to the server-based fishing prediction application 110.

In some embodiments, fishing prediction system 100 and method 300 may utilize multiple data sources 170, such as NWS 172, NOAA 174, and/or NASA 176, that provide multiple types of data, such as, but not limited to, satellite data (e.g., sea surface temperature, altimetry, currents, bathymetry, chlorophyll/plankton), forecast weather data (e.g., wind, wave, weather), tides and astronomy data and wherein the data may be processed with respect to the personal preferences (called attributes) of users 105.

In some embodiments, fishing prediction system 100 and method 300 may provide a "virtual buoy" system that may include, but is not limited to, one or more virtual buoys 212 that can pull data from different sources like forecast data providers (forecasted) and satellite data providers (near real-time data readings) to provide data that users may use to plan out a fishing trip and wherein the data may be used to (1) provide daily forecasts and (2) look forward and forecast upcoming good fishing days based on the user 105's configured attributes. Accordingly, fishing prediction system 100 and method 300 may provide the ability to build a forecasting model based on (1) an individual user profile and (2) a virtual buoy system.

In some embodiments, fishing prediction system 100 and method 300 may provide fishing mobile app 162 by which users 105 may create, upload, and/or manage waypoints (i.e., any geographic locations of interest) that may be used for forecasting fishing days and routes and wherein the waypoints may include, but are not limited to, actual buoys (e.g., NOAA buoys 210), virtual buoys 212, fish sites 214, wreck sites 216, rocks sites 218, ledge sites 220, sandbar sites 222, any other waypoint sites 224, and the like.

In some embodiments, fishing prediction system 100 and method 300 may provide a fishing mobile app 162 that utilizes fishing analytics module 130 that includes modern machine learning, analytics, and data modeling capabilities to capture various data inputs from actual buoys, virtual buoys, forecasts, and/or actual user input that allows the models to continuously improve overtime.

Again, the subject matter of the invention has been discussed above primarily in the manner of a fishing prediction system and method. However, the subject matter of the invention may further apply to other activities, such as hunting. The system and method as described above, would operate in essentially the same manner as a hunting prediction system and method. For example, waypoints would still be geographic locations of interest, and used for forecasting hunting days and routes and wherein the waypoints may still include, but are not limited to, actual buoys (e.g., NOAA buoys 210), virtual buoys 212 (for example, for waterfowl hunting), and may further include terrestrial waypoints, e.g., fields, trails, stands, blinds, feeder sites, landmarks, and/or any other waypoint sites. In some embodiments, in the hunting prediction embodiment and method, the system and method may utilize the same or similar ones of the multiple data sources (e.g., NWS 172, NOAA 174, and/or NASA 176), and/or any other data sources that provide multiple types of data relevant to and/or related to hunting, such as, but not limited to, satellite data, forecast weather data, astronomy data, breeding cycles, rut, migration patterns, sunrise/sunset, and the like.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the present invention. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A remotely accessible predictive fishing and/or hunting mapping and notification system comprising:
   a. a server, the server including a remotely accessible predictive fishing and/or hunting mapping and notification application, a controller, operating memory, and a communications interface, wherein the server is accessible via a network;
   b. a data store in communication with the server;
   c. one or more data sources, wherein the one or more data sources are accessible to the predictive fishing and/or hunting mapping and notification application via the network; and
   d. wherein the controller is configured to execute stored program instructions, comprising:
      i. providing access to a user;
      ii. receiving user profile data comprising personalized attributes data;
      iii. receiving waypoint data for one or more geographically distinctive waypoints;
      iv. receiving data from the one or more data sources;
      v. processing the received data;
      vi. generating fishing and/or hunting forecasting models based on the processed data; and
      vii. generating and providing automated fishing and/or hunting notifications to the user based on certain criteria of the personalized attributes data and/or as a result of a change in a forecasting model.

2. The system of claim 1, wherein data from the one or more data sources comprises one or more of satellite data, forecast/weather data, tide data, and astronomy data.

3. The system of claim 1, wherein the one or more data sources comprise one or more of National Weather Service (NWS), National Oceanic and Atmospheric Administration (NOAA), National Aeronautics and Space Administration (NASA), and/or other data source providers.

4. The system of claim 1, wherein the user accesses the predictive fishing and/or hunting mapping and notification application of the remotely accessible predictive fishing and/or hunting mapping and notification system through the network via a web browser using a computing device.

5. The system of claim 1, wherein the user accesses the predictive fishing and/or hunting mapping and notification application of the remotely accessible predictive fishing and/or hunting mapping and notification system via a local predictive fishing and/or hunting mapping and notification application installed on a computing device.

6. The system of claim 1, wherein the personalized attributes data comprises conditions, parameters, and/or settings preferred by the user for certain fishing and/or hunting attributes.

7. The system of claim 1, wherein the attributes comprise one or more of speed, distance, temperature measurement settings; location specific conditions; lunar phase; equipment; and/or location specific actual historical hunting/fishing data.

8. The system of claim 1, wherein the controller is further configured to execute stored program instructions, comprising receiving feedback data from the user and updating the waypoint data and/or forecasting models.

9. The system of claim 8, wherein the feedback data comprises, for a given waypoint during an actual fishing and hunting event, one or more of actual fishing and hunting results, actual weather/environmental conditions, and equipment used.

10. The system of claim 1, wherein each of the one or more waypoints comprise a specific geographic location.

11. The system of claim 10, wherein the specific geographic location comprises an actual buoy or a virtual buoy.

12. The system of claim 10, wherein the controller is further configured to execute stored program instructions, comprising displaying information related to a selected one or more of the one or more waypoints.

13. The system of claim 10, wherein the controller is further configured to execute stored program instructions, comprising displaying information related to a selected one or more of the one or more waypoints in real-time and/or over a defined period of time.

14. The system of claim 10, wherein the controller is further configured to execute stored program instructions, comprising displaying a user selected geographic region and overlaying one or more of one or more waypoints within the displayed geographic region, current and/or historical waypoint data of the one or more waypoints within the displayed geographic region, and current and/or historical data from the one or more data sources related to the displayed geographic region and/or the one or more waypoints within the displayed geographic region.

15. A method of using remotely accessible predictive fishing and/or hunting mapping and notification system, the method comprising:
   a. providing a remotely accessible predictive fishing and hunting mapping and notification system, comprising:
      i. a server, the server including a predictive fishing and/or hunting mapping and notification application, a controller, operating memory, and a communications interface, wherein the server is accessible via a network;
      ii. a data store in communication with the server;
      iii. one or more data sources, wherein the one or more data sources are accessible to the predictive fishing and/or hunting mapping and notification application via the network; and
      iv. wherein the controller is configured to execute stored program instructions, comprising:
         A. providing access to a user;
         B. receiving user profile data comprising personalized attributes data;
         C. receiving waypoint data for one or more geographically distinctive waypoints;
         D. receiving data from the one or more data sources;
         E. processing the received data;
         F. generating fishing and hunting forecasting models based on the processed data; and
         G. generating and providing automated fishing and/or hunting notifications to the user based on certain criteria of the personalized attributes data and/or as a result of a change in a forecasting models;
   b. accessing the predictive fishing and/or hunting mapping and notification application;
   c. selecting and/or creating one or more waypoints, wherein each of the one or more waypoints comprise a specific geographic location;
   d. collecting waypoint data;
   e. processing the waypoint data based on one or more personalized attributes of a user's profile data; and
   f. sending automated notifications to the user based on certain criteria of the user's profile data and the processed data.

16. The method of claim 15, further comprising providing feedback data from the user and updating the waypoint data and/or forecasting models.

17. The method of claim 16, wherein the feedback data comprises, for a given waypoint during an actual fishing and/or hunting event, one or more of actual fishing and/or hunting results, actual weather/environmental conditions, and equipment used.

18. The method of claim 15, further comprising displaying information related to a selected one or more of the one or more waypoints.

* * * * *